US006848962B2

(12) United States Patent
Kitamura et al.

(10) Patent No.: US 6,848,962 B2
(45) Date of Patent: Feb. 1, 2005

(54) ELECTRON-EMITTING DEVICE, ELECTRON SOURCE, IMAGE-FORMING APPARATUS, AND METHOD FOR PRODUCING ELECTRON-EMITTING DEVICE AND ELECTRON-EMITTING APPARATUS

(75) Inventors: Shin Kitamura, Kanagawa (JP); Takeo Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 09/940,643

(22) Filed: Aug. 29, 2001

(65) Prior Publication Data

US 2002/0031972 A1 Mar. 14, 2002

(30) Foreign Application Priority Data

Sep. 1, 2000 (JP) ...................................... 2000-265822
Aug. 24, 2001 (JP) ...................................... 2001-254636

(51) Int. Cl.[7] .................................................. H01J 9/00
(52) U.S. Cl. ...................................................... 445/24
(58) Field of Search ............................ 445/3, 6, 24, 50

(56) References Cited

U.S. PATENT DOCUMENTS

| | | | |
|---|---|---|---|
| 4,728,851 A | 3/1988 | Lambe ........................ 313/309 |
| 4,816,289 A | 3/1989 | Komatsu et al. .......... 423/447.3 |
| 4,900,483 A | 2/1990 | Witzke et al. ............... 313/309 |
| 4,904,895 A | 2/1990 | Tsukamoto et al. ......... 313/336 |
| 4,956,578 A | 9/1990 | Shimizu et al. ................ 315/3 |
| 5,066,883 A | 11/1991 | Yoshioka et al. ............ 313/309 |
| 5,185,554 A | 2/1993 | Nomura et al. .............. 313/495 |
| 5,192,240 A | 3/1993 | Komatsu ...................... 445/24 |
| 5,214,346 A | 5/1993 | Komatsu ..................... 313/309 |
| 5,382,867 A | 1/1995 | Maruo et al. ............... 313/309 |
| 5,443,859 A | 8/1995 | Nagata ........................ 427/122 |
| 5,458,784 A | 10/1995 | Baker et al. ................. 210/674 |
| 5,500,200 A | 3/1996 | Mandeville et al. ...... 423/447.3 |
| 5,543,684 A | 8/1996 | Kumar et al. ................ 313/495 |

(List continued on next page.)

FOREIGN PATENT DOCUMENTS

| | | | | |
|---|---|---|---|---|
| CN | 1181607 A | 5/1998 | | |
| EP | 0 290 026 A1 | 11/1988 | ............. | H01J/3/02 |
| EP | 0 394 698 A2 | 10/1990 | ............. | H01J/1/30 |
| EP | 0 433 507 A1 | 6/1991 | ........... | D01F/9/127 |
| EP | A1 443 865 | 8/1991 | ............ | H01J/21/10 |

(List continued on next page.)

OTHER PUBLICATIONS

R.T.K. Baker et al., "Formation of Carbonaceous Deposits from the Platinum–Iron Catalyzed Decomposition of Acyetylene," 37 J. Catal. 101–105 (1975).
R.T.K. Baker, "Catalytic Growth of Carbon Filaments," 27 (3) Carbon 315–323 (1989).
S. Iljima, "Helical Microtubules of Graphitic Carbon," Nature, vol. 345, 56–58 (1991).
T.W. Ebbesen et al., "Large–Scale Synthesis of Carbon Nanotubes," Nature, vol. 358, 220–222 (1992).

(List continued on next page.)

*Primary Examiner*—Dean A. Reichard
*Assistant Examiner*—Adolfo Nino
(74) *Attorney, Agent, or Firm*—Fitzpatrick, Cella, Harper & Scinto

(57) ABSTRACT

A method for producing a durable electron-emitting device having a uniform electron emission characteristic, an electron source, and an image-forming apparatus having a uniform display characteristic for a long period are provided. The method for producing an electron-emitting device according to the present invention includes the steps of: disposing a cathode electrode on a surface of a substrate; providing an electrode opposite the cathode electrode; disposing plural pieces of fiber containing carbon as a main component on the cathode electrode; and applying potential higher than potential applied to the cathode electrode under depressurized condition to an electrode opposite the cathode electrode.

44 Claims, 12 Drawing Sheets

FIG. 2B

U.S. PATENT DOCUMENTS

| | | | |
|---|---|---|---|
| 5,551,903 A | 9/1996 | Kumar et al. ................ 445/24 |
| 5,577,943 A | 11/1996 | Vickers et al. ............... 445/24 |
| 5,612,587 A | 3/1997 | Itoh et al. .................... 313/309 |
| 5,618,875 A | 4/1997 | Baker et al. ................. 524/495 |
| 5,690,997 A | 11/1997 | Grow ....................... 427/249.1 |
| 5,726,524 A | 3/1998 | Debe ........................... 313/309 |
| 5,770,918 A | 6/1998 | Kawate et al. ............... 313/495 |
| 5,773,921 A | 6/1998 | Keesman et al. ............ 313/309 |
| 5,847,495 A | 12/1998 | Yamanobe et al. ......... 313/310 |
| 5,872,422 A | 2/1999 | Xu et al. ...................... 313/311 |
| 5,872,541 A | 2/1999 | Yoshioka et al. ........... 345/74.1 |
| 5,935,639 A | 8/1999 | Sullivan et al. ................ 427/78 |
| 5,965,267 A | 10/1999 | Nolan et al. ................. 428/408 |
| 5,973,444 A | 10/1999 | Xu et al. ...................... 313/309 |
| 5,981,305 A | 11/1999 | Hattori ........................... 438/20 |
| 5,982,091 A | 11/1999 | Konishi ........................ 313/495 |
| 5,986,389 A | 11/1999 | Tsukamoto ................... 313/309 |
| 6,087,765 A | 7/2000 | Coll et al. .................... 313/309 |
| 6,097,138 A | 8/2000 | Nakamoto ................... 313/309 |
| 6,129,602 A | 10/2000 | Yamanobe ..................... 445/24 |
| 6,135,839 A | 10/2000 | Iwase et al. .................... 445/24 |
| 6,147,449 A | 11/2000 | Iwasaki et al. .............. 313/495 |
| 6,171,162 B1 | 1/2001 | Iwasaki et al. ................. 445/6 |
| 6,184,610 B1 | 2/2001 | Shibata et al. ............... 313/309 |
| 6,204,597 B1 | 3/2001 | Xie et al. ..................... 313/310 |
| 6,228,904 B1 | 5/2001 | Yadav et al. ................. 523/210 |
| 6,231,413 B1 | 5/2001 | Tsukamoto ..................... 445/24 |
| 6,246,168 B1 | 6/2001 | Kishi et al. .................. 313/495 |
| 6,283,812 B1 | 9/2001 | Jin et al. ........................ 445/24 |
| 6,283,815 B1 * | 9/2001 | Iwasaki et al. ................. 445/24 |
| 6,288,494 B1 | 9/2001 | Tsukamoto et al. ....... 315/169.1 |
| 6,290,564 B1 | 9/2001 | Talin et al. ..................... 445/50 |
| 6,306,001 B1 * | 10/2001 | Hiroki ............................ 445/6 |
| 6,313,572 B1 | 11/2001 | Yamada ....................... 313/310 |
| 6,331,690 B1 | 12/2001 | Yudasaka et al. ......... 219/121.6 |
| 6,333,016 B1 | 12/2001 | Resasco et al. ............ 423/447.3 |
| 6,390,612 B1 | 5/2002 | Kotaki et al. ................... 347/85 |
| 6,400,091 B1 | 6/2002 | Deguchi et al. .......... 315/169.1 |
| 6,413,487 B1 | 7/2002 | Resasco et al. ............ 423/447.3 |
| 6,420,726 B2 | 7/2002 | Choi et al. ..................... 257/10 |
| 6,435,928 B1 * | 8/2002 | Tsukamoto ..................... 445/24 |
| 6,445,006 B1 | 9/2002 | Brandes et al. ................. 257/76 |
| 6,448,709 B1 | 9/2002 | Chuang et al. .............. 313/497 |
| 6,455,021 B1 | 9/2002 | Saito ........................... 423/447.3 |
| 6,471,936 B1 | 10/2002 | Chen et al. ................. 423/658.2 |
| 6,472,814 B1 | 10/2002 | Yamanobe et al. ......... 313/495 |
| 6,512,329 B1 * | 1/2003 | Mitsutake et al. .............. 445/24 |
| 6,517,399 B1 * | 2/2003 | Ito et al. ......................... 445/24 |
| 6,541,906 B2 | 4/2003 | Lee et al. ..................... 313/495 |
| 6,605,894 B2 | 8/2003 | Choi et al. ................... 313/495 |
| 6,624,589 B2 | 9/2003 | Kitamura et al. ......... 315/169.3 |
| 6,626,719 B2 | 9/2003 | Ono et al. ...................... 445/24 |
| 6,628,053 B1 | 9/2003 | Den et al. .................... 313/310 |
| 6,645,028 B1 | 11/2003 | Dean et al. ...................... 445/6 |
| 2001/0006232 A1 | 7/2001 | Choi et al. ..................... 257/10 |
| 2001/0006869 A1 * | 7/2001 | Okamoto et al. .............. 445/51 |
| 2002/0009637 A1 | 1/2002 | Murakami et al. ........... 429/213 |
| 2002/0047513 A1 | 4/2002 | Nomura ....................... 313/495 |
| 2002/0047562 A1 | 4/2002 | Kitamura et al. ......... 315/169.3 |
| 2002/0057045 A1 | 5/2002 | Tsukamoto ................... 313/309 |
| 2002/0060516 A1 | 5/2002 | Kawate et al. ............... 313/495 |
| 2002/0136896 A1 | 9/2002 | Takikawa et al. ........... 428/408 |
| 2002/0146958 A1 | 10/2002 | Ono et al. ...................... 445/24 |
| 2003/0006684 A1 | 1/2003 | Kawate et al. ............... 313/311 |
| 2003/0048055 A1 | 3/2003 | Ishikura et al. .............. 313/311 |
| 2003/0048056 A1 | 3/2003 | Kitamura et al. ............ 313/311 |
| 2003/0057860 A1 | 3/2003 | Tsukamoto ............... 315/169.3 |
| 2004/0077249 A1 * | 4/2004 | Saito et al. ..................... 445/24 |

FOREIGN PATENT DOCUMENTS

| | | | |
|---|---|---|---|
| EP | 0 290 026 B1 | 2/1993 | ............ H01J/3/02 |
| EP | 0 535 953 A2 | 4/1993 | ............ H01J/1/30 |
| EP | 0 614 209 A1 | 9/1994 | |
| EP | 0 535 953 B1 | 1/1996 | ............ H01J/1/30 |
| EP | 0 716 439 A1 | 6/1996 | ............ H01J/3/02 |
| EP | 0 758 028 A2 | 2/1997 | ........... D01F/9/127 |
| EP | 0 797 233 A2 | 9/1997 | ............ H01J/1/30 |
| EP | 0 836 217 A1 | 4/1998 | ............ H01J/29/94 |
| EP | 0 871 195 A1 | 10/1998 | ............ H01J/1/30 |
| EP | 0 913 508 A3 | 5/1999 | ........... D01F/9/127 |
| EP | 0 913 508 A2 | 5/1999 | ........... D01F/9/127 |
| EP | 0 936 650 A1 | 8/1999 | ............ H01J/3/02 |
| EP | 0 980 089 A1 | 2/2000 | ............ H01J/1/30 |
| EP | 0 451 208 B1 | 3/2000 | ........... D01F/9/12 |
| EP | 0 986 084 A2 | 3/2000 | ............ H01J/1/30 |
| EP | 1 022 763 A1 | 7/2000 | |
| EP | 1 096 533 A1 | 5/2001 | ............ H01J/9/02 |
| EP | 1 102 299 A1 | 5/2001 | ............ H01J/1/30 |
| EP | 1 113 478 A1 | 7/2001 | ............ H01J/3/02 |
| EP | 1 117 118 A1 | 7/2001 | ............ H01J/1/312 |
| EP | 1 120 877 A1 | 8/2001 | ............ H02G/5/06 |
| EP | 1 122 344 A2 | 8/2001 | ........... D01F/9/127 |
| EP | 1 122 344 A3 | 1/2002 | |
| EP | 1 187 161 A2 | 3/2002 | ............ H01J/3/02 |
| EP | 0 758 028 B1 | 9/2002 | ........... D01F/9/127 |
| GB | 2 308 495 | 6/1997 | ............ H01J/1/20 |
| JP | WO 89/07163 | 8/1989 | ........... D01F/9/12 |
| JP | 1-309242 | 12/1989 | ............ H01J/37/06 |
| JP | 2-112125 | 4/1990 | ............ H01J/1/30 |
| JP | 3-20941 | 1/1991 | ............ H01J/31/12 |
| JP | 03-260119 | 11/1991 | ........... D01F/9/127 |
| JP | 03-295131 | 12/1991 | ............ H01J/1/30 |
| JP | 04-212236 | 3/1992 | ............ H01J/1/30 |
| JP | 05-159696 | 6/1993 | ............ H01J/1/30 |
| JP | 05-198253 | 8/1993 | ............ H01J/1/30 |
| JP | 05-211029 | 8/1993 | ............ H01J/1/30 |
| JP | 5-211029 | 8/1993 | ............ H01J/1/30 |
| JP | 05-274997 | 10/1993 | ............ H01J/1/30 |
| JP | 7-6714 | 1/1995 | |
| JP | 8-115652 | 5/1996 | |
| JP | 08-115652 | 5/1996 | ............ H01J/1/30 |
| JP | 8-264109 | 10/1996 | ............ H01J/1/30 |
| JP | 08-298068 | 11/1996 | ............ H01J/1/30 |
| JP | 9-82214 | 3/1997 | ............ H01J/1/30 |
| JP | 09-188600 | 7/1997 | ........... C30B/29/62 |
| JP | 09-270227 | 10/1997 | ............ H01J/1/30 |
| JP | 10-149760 | 6/1998 | ............ H01J/1/30 |
| JP | 10-199398 | 7/1998 | ............ H01J/1/30 |
| JP | 10-289650 | 10/1998 | ............ H01J/1/30 |
| JP | 11-139815 | 5/1999 | ........... C01B/31/02 |
| JP | 11-162334 | 6/1999 | ............ H01J/9/02 |
| JP | 11-194134 | 7/1999 | ............ G01N/37/00 |
| JP | 11-232997 | 8/1999 | ............ H01J/1/30 |
| JP | 2000-57934 | 2/2000 | ............ H01J/1/304 |
| JP | 2000-86216 | 3/2000 | ........... C01B/31/02 |
| JP | 2000-90809 | 3/2000 | ............ H01J/1/304 |
| JP | 2000-95509 | 4/2000 | ........... C01B/31/02 |
| JP | 2000-191302 | 7/2000 | ............ C01B/3/00 |
| JP | 2000-208028 | 7/2000 | |
| JP | 2000-223005 | 8/2000 | |
| JP | 2000-223012 | 8/2000 | ............ H01J/9/02 |
| JP | 2000/277003 | 10/2000 | ............ H01J/9/02 |
| JP | 2001-52598 | 2/2001 | ............ H01J/1/316 |
| JP | 2001-162600 | 6/2001 | ............ B82B/1/00 |
| JP | 2001-288625 A | 10/2001 | ........... D01F/9/127 |
| JP | 2003-536215 | 12/2003 | ............ H01J/9/02 |
| KR | 1999-019614 | 3/1999 | ............ H01J/17/49 |
| WO | WO 90/07023 | 6/1990 | ........... D01F/9/12 |
| WO | WO 98/05920 | 2/1998 | ........... G01B/7/34 |
| WO | WO 99/58748 | 11/1999 | ........... D01F/9/127 |

| WO | 99/58748 | 11/1999 | ............ D01F/9/127 |
| WO | WO 01/26130 | 4/2001 | ............. H01J/9/20 |
| WO | WO 01/93292 A1 | 12/2001 | ............. H01J/1/304 |
| WO | WO 01/95360 A1 | 12/2001 | |

OTHER PUBLICATIONS

W. A. DeHeer et al., "Aligned Carbon Nanotube Films: Production and Optical and Electronic Properties," Science vol. 268, 845–847 (1995).

T. Guo et al., "Catalytic Growth of Single–Walled Nanotubes by Laser Vaporization," Chem Phys. Lett., vol. 243, 49–54 (1995).

A. G. Rinzler et al., "Unraveling Nanotubes: Field Emission from an Atomic Wire," Science, vol. 269, 1550–1553 (1995).

W. A. DeHeer et al., "A Carbon Nanotube Field–Emission Electron Source," Science, vol. 270, 1179–1180 (1995).

T. Kyotani et al., "Preparation of Ultrafine Carbon Tubes in Nanochannels of an Anodic Aluminum Oxide Film," Chem. Mater., vol. 8, 2109–2113 (1996).

A. Thess et al., "Crystalline Ropes of Metallic Carbon Nanotubes," Science, vol. 273 483–487 (1996).

H. Dai et al., "Single–Wall Nanotubes Produced by Metal–Catalyzed Disproportionati n of Carbon Monoxide," Chem. Phys. Lett., vol. 260, 471–475 (1996).

H. Dai et al., "Nanotubes as Nanoprobes in Scanning Probe Microscopy," Nature, vol. 384, 147–150 (1996).

A. C. Dillon et al., "Storage of Hydrogen in Single–Walled Carbon Nanotubes," Nature, vol. 386, 377–379 (1997).

W.P. Dyke et al., "Field Emission", *Advances in Electronics and Electron Physics*, vol. 8, (1956) pp. 89–185.

C.A. Mead, "Operation of Tunnel–Emission Devices", *Journal of Applied Physics*, vol. 32, No. 4, (1961), pp. 646–652.

Toshiaki Kusunoki et al., "Fluctuation–Free Electron Emission from Non–Formed Metal–Insulator–Metal (MIM) Cathodes Fabricated by Low Current Anodic Oxidation", *Japanese Journal of Applied Physics*, vol. 32 No. 11B, (1993), p. L1695–1697.

M.I. Elinson et al., "The Emission of Hot Electrons and the Field Emission of El ctrons from Tin Oxide", *Radio Engineering and Electronic Physics*, (1985) pp. 1290–1296.

G. Dittmer, "Electrical Conduction and Electron Emission of Discontinuous Thin Films", *Thin Solid Films*, vol. 9, (1972) pp. 317–329.

M. Hartwell et al., "Strong Electron Emission from Patterned Tin–indium Oxide Thin Film" , IEEE Trans. Ed. Conf., (1983) pp. 519–521.

Hisashi Araki et al., Electroforming and Electron Emission of Carbon Thin Films, Journal f th Vacuum Society of Japan, 1983 (with English Abstract on p. 22).

Rodriguez et al., "Catalytic Engineering of Carbon Nanostructures," Langmuir 11, 3862–3866 (1995).

W. Zhu Et Al., *Electron Field Emission From Nanostructured Diamond and Carbon Nanotubes*, Solid State Electronics, vol. 45, 2001, pp. 921–928.

J.M Bonard Et Al., *Field Emission From Carbon Nanotubes: The First Five Years*, Solid State Electronics, vol. 45, 2001, pp. 893–914.

A.M. Rao et al., "In Situ–grown Carbon Nanotube Array of with Excellent Field Emission Characteristics," Applied Physics Letter, vol. 76, No. 25, pp. 3813–3815 (2000).

Cheol Jin Lee et al., "Carbon Nanofibers Grown on Sodalime Glass at 500° C. Using Thermal Chemical Deposition," Chemical Physics Letters 340, pp. 413–418 (2001).

Sashiro Uemura et al., "Carbon Nanotube FED with Graphite–Nano–Fiber Emitters," ISSN 1083–1312, pp. 398–401.

Q.H. Wang et al., "A Nanotube–Based Field–Emission Flat Panel Display," Applied Physics Letters, vol. 72, No. 22, Jun. 1998, pp. 2912–2913.

C.A. Spindt et al., *Physical Properties of thin–Film Field Emission Cathodes with Molybdenum Cones*, Journal of Applied Physics, vol. 47, No. 12 (1976) pp. 5248–5263.

* cited by examiner

AXIAL DIRECTION OF FIBER

GRAPHEN

AXIAL DIRECTION OF FIBER

GRAPHEN

GRAPHEN

AXIAL DIRECTION OF FIBER

ELECTRON-EMITTING DEVICE, ELECTRON SOURCE, IMAGE-FORMING APPARATUS, AND METHOD FOR PRODUCING ELECTRON-EMITTING DEVICE AND ELECTRON-EMITTING APPARATUS

BACKGROUND OF THE INVENTION

1. Field of the Invention

The present invention relates to an electron-emitting device, an electron source using therewith, an image-forming apparatus, and a method for producing an electron-emitting device.

2. Related Background Art

A field emission type (FE-type) electron-emitting device for emitting an electron from a metal surface with a strong field over $10^6$ V/cm applied to the metal has attracted attention as one of the effective cold electron sources.

If an FE-type cold electron source is put to practical use, a thin-type emissive image display device can be realized, thereby contributing to a power saving and lightweight system.

FIG. 12 shows a vertical FE-type structure. In FIG. 12, reference numeral 121 denotes a substrate, reference numeral 123 denotes an emitter electrode, reference numeral 124 denotes an insulation layer, reference numeral 125 denotes an emitter, reference numeral 126 denotes an anode, and reference numeral 127 denotes the shape of an electron beam emitted to the anode. An aperture is formed in the layers of the insulation layer 124 and a gate electrode 122 arranged on the cathode electrode 123. The conical emitter 125 is provided in the aperture (the structure is hereinafter referred to as a Spindt type structure). The structure is disclosed by, for example, C. A. Spindt, "Physical Properties of thin-film field emission cathodes with molybdenum cones", J. Appl. Phys., 47,5248 (1976), etc.

Furthermore, an example of a lateral FE-type electron-emitting device can be formed by an emitter electrode having a pointed end and a gate electrode (extracting electrode) for extracting an electron from the end of the emitter electrode arranged parallel to the substrate with a collector (referred to as an anode in the present invention) provided in the direction vertical to the opposing direction of the gate electrode and the emitter electrode.

An example of an electron-emitting device using a fibrous carbon is disclosed by Japanese Patent Application Laid-Open No. 8-115652, Japanese Patent Application Laid-Open No. 2000-223005, European Patent Publication EP-A1-1022763, etc.

SUMMARY OF THE INVENTION

In the image-forming apparatus using the above mentioned FE-type electron source, an electron beam spot (hereinafter referred to as a beam diameter) can be obtained depending on the distance H from the electron source to the phosphor, the anode voltage Va between the electron-emitting device and the phosphor, the device voltage Vf between the cathode electrode and the leading electrode. The above mentioned beam span is submillimeter, and has sufficient resolution as an image-forming apparatus.

However, in the image-forming apparatus such as an image display device, etc., resolution with higher precision has been requested recently.

Furthermore, with an increasing number of displayed pixels, power consumption has risen from a large device capacity of the electron-emitting device when it is driven. Therefore, it has been demanded to reduce the device capacity and the device voltage, and improve the efficiency of the electron-emitting device.

Furthermore, it is necessary to have uniform characteristic of the electron-emitting device to avoid uneven distribution of the brightness among the pixels due to the uneven characteristics of the electron-emitting devices.

As a result, it is requested to reduce the capacity of a device, the device voltage, and the uneven characteristics among electron-emitting devices.

In the Spindt-type electron-emitting device shown in FIG. 12, a parasitic capacity has been formed between a large gate capacity and a number of emitters 125 by the layer structure of a gate electrode 122 and a substrate 121. Furthermore, the device voltage of the spindt-type FE is as high as several tens of V, thereby causing the problem of large power consumption from a large capacity.

Additionally, since extracted electron beams diffuse, a focusing electrode has been required to suppress the diffusion of the beams. For example, Japanese Patent Application Laid-Open No. 07-006714 discloses a method of focusing the trajectory by providing an electrode for focusing electrons. However, this method has the problem that the process step of assigning the focusing electrode is complicated, and that the electron emission efficiency is low.

Furthermore, since a common horizontal FE is designed such that an electron emitted from a normal cathode easily crashes against the gate electrode, the efficiency (the ratio of the electric current flowing through a gate to the electric current reaching the anode) is lowered, and the beams largely diffuse at the anode.

With electron-emitting devices formed by a set of fibrous carbon, local electron emission (electric field concentration) is apparent when there are large differences in length and shape among the devices. Therefore, the current density accompanied by the electron emission becomes high at a portion where local electric field concentration arises, thereby possibly deteriorating the electron emission characteristic and shortening the life of the device.

Additionally, with the image-forming apparatus having a plurality of the above mentioned devices, the above mentioned events cause the apparent distribution of the amount of Ie (emission current) of each electron-emitting device, thereby reducing the performance of the image-forming apparatus by resulting in the poor display of gray scale images, flickering images, etc.

The present invention has been developed to solve the above mentioned problems, and aims at providing a durable electron-emitting device, electron source, image-forming apparatus having a uniform display characteristic for a long period, and a method for easily producing the electron-emitting device and the image-forming apparatus by guaranteeing a uniform electron emission characteristic.

To attain the above mentioned purpose, the method for producing an electron-emitting device according to the present invention includes on the surface of a substrate the steps of: arranging a cathode electrode; arranging an electrode opposite the cathode electrode; arranging a plurality of fibers mainly made of carbon on the cathode electrode; and applying higher potential to the electrode opposite the cathode electrode than the potential applied to the cathode electrode under the depressurized condition.

Another method for producing the electron source according to the present invention to attain the above mentioned purpose includes the steps of: arranging on the substrate a plurality of electron-emitting devices each having a plurality of fibers mainly made of carbon, and a plural pieces of wire each being electrically connected to at least one of the plurality of electron-emitting devices; applying a voltage to at least a part of the plurality of electron-emitting devices and measuring the electric characteristic of the electron-emitting device to which the voltage has been applied; and reducing the difference in electric characteristic among the plurality of electron-emitting devices based on the measurement result. The step of reducing the difference in characteristic among the above mentioned plurality of electron-emitting devices includes the step of allowing electrons to be emitted from at least one of the plurality of electron-emitting devices under the depressurized condition.

Furthermore, it is preferable that the step of emitting an electron from the above mentioned electron-emitting device is performed under the condition of a gas physically or chemically reactive to the fiber. In this process, the portion where an electric field concentrates in the fiber is made to be reactive for a partial etching process. As a result, the stable and uniform electron-emitting device, electron source, and image-forming apparatus can be produced.

It is preferable that the gas chemically reactive to the fiber contains $H_2$, $H_2O$, $O_2$, or $CO_2$. Otherwise, it is desired that the gas chemically reactive to the fiber is a combination of $H_2$ gas and one of $H_2O$, $O_2$, and $CO_2$ gas.

DETAILED DESCRIPTION OF THE PREFERRED EMBODIMENTS

Figure 1A:
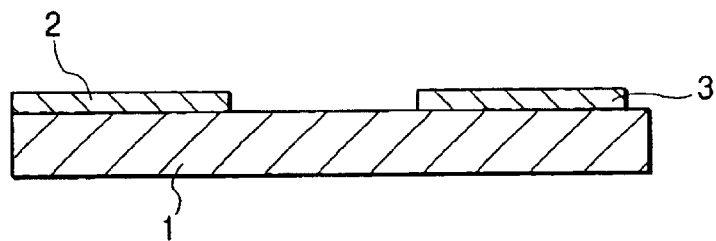
FIGS. 1A, 1B, 1C, 1D and 1E show a method for producing an electron-emitting device according to the first embodiment.
Figure 1B:
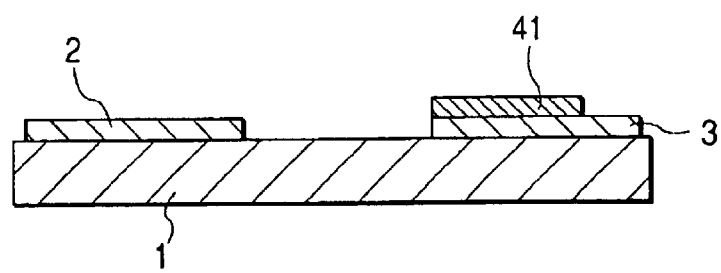
Figure 1C:
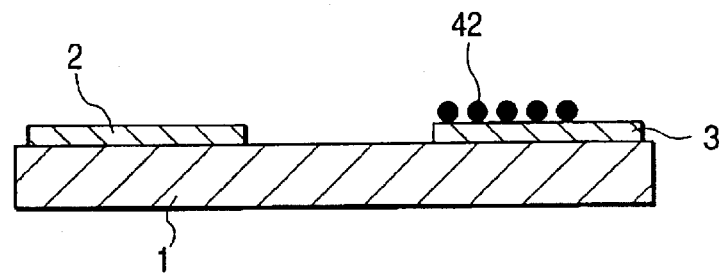
Figure 1D:
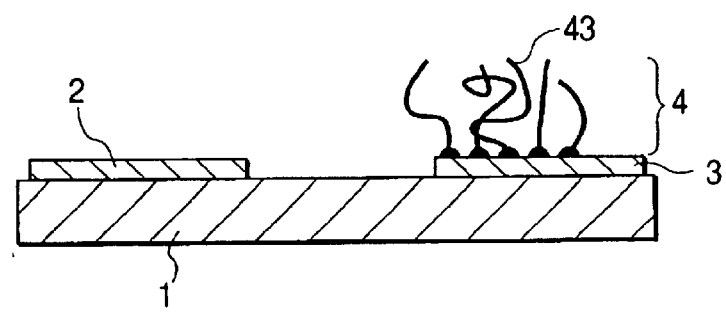
Figure 1E:
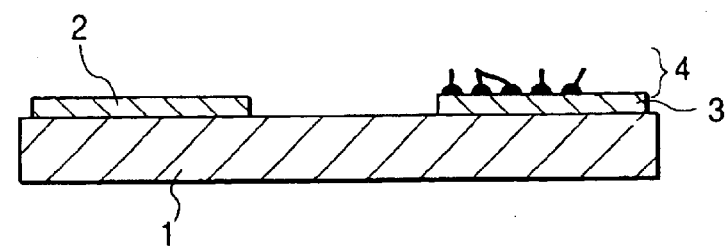

The preferred embodiments of the present invention are described below in detail by referring to the attached drawings. However, the present invention is not limited to the dimensions, materials, shapes, and relative arrangements of the components of the embodiments unless otherwise specified.

Described first below is the equalizing process of the electron emission characteristic of an electron-emitting device.

According to the present invention, it is most desirable to use fibrous carbon as an electron-emitting member of an electron-emitting device. Since fibrous carbon has a very large aspect ratio, it easily enhances an electric field. Therefore, it is possible to emit an electron at a low voltage, and the fibrous carbon is recommended as an electron-emitting member according to the present invention.

The "fibrous carbon" according to the present invention can refer to a "columnar substance chiefly made of carbon" or "linear substance chiefly made of carbon". Furthermore, the "fibrous carbon" can also be referred to as "fiber chiefly made of carbon". To be more practical, the "fibrous carbon" according to the present invention also includes carbon nanotube, graphite nanofiber, and amorphous carbon fiber. Especially, graphite nanofiber is the most desirable as an electron-emitting member.

However, when the fibrous carbon is used as an electron-emitting member, it is frequently used as a set of plural pieces of fibrous carbon in consideration of the production method. Since it is very difficult to equalize the shapes of the fibrous carbon in thickness, length, etc., there often occurs unevenness in characteristic among the electron-emitting devices if the set of plural pieces of fibrous carbon is used as an electron-emitting member of an electron-emitting device.

Under the situation, according to the present invention, a process of reducing the difference in electron emission characteristic among electron-emitting devices (equalizing process) is performed to control the electron emission characteristic of the electron-emitting device in which plural pieces of fibrous carbon is used as an electron-emitting member.

The "equalizing process" which is the characteristic of the method for producing the electron-emitting device according to the present invention is performed by applying a voltage to an electron-emitting device after arranging plural pieces of fibrous carbon on the electrode (cathode electrode) to which potential, which is lower than the potential to the opposite electrode (extracting electrode) in a pair of electrodes forming the electron-emitting device when the device is driven, is applied.

This method is especially convenient and effective when an electron source, an image-forming apparatus, etc. are formed using a plurality of electron-emitting devices.

The "equalizing process" according to the present invention not only reduces the difference in electron emission characteristic among a plurality of electron-emitting devices, but also improves the electron emission characteristic of one electron-emitting device.

That is, the electron-emitting device immediately after forming fibrous carbon indicates the difference in shape among plural pieces of fibrous carbon. Such a device can form a portion where an electric field specifically concentrates. When such an electron-emitting device having specific electric field concentration is operated, electrons are emitted with concentration from the specific portion, and a load is excessively generated in the portion. As a result, the electron emission characteristic is suddenly damaged, and no sufficient performance of an electron-emitting device can be obtained.

Therefore, by performing the "equalizing process" according to the present invention, the portion in which an electric field specifically concentrates can be removed, and electrons are substantially equally emitted from a number of pieces of fibrous carbon (the number of electron emission sites is increased). As a result, electron-emitting devices having an excellent electron emission characteristic and stable for a long period can be obtained.

It is desired that the above mentioned "equalizing process" according to the present invention is performed by applying a voltage to a device under the condition of a substance reactive to the fibrous carbon.

The principle of the equalizing process is performed by an etching operation using the heat generated when an electron is emitted from the fibrous carbon, which is an electron-emitting portion, into a vacuum. In addition, when the process is performed under the condition of the substance reactive to fibrous carbon, the reactive substance in the condition and the fibrous carbon are selectively reactive to each other, thereby performing a partial etching process.

Since the fibrous carbon chiefly contains carbon, the following reactions occur.

$$C + H_2O \rightarrow H_2\uparrow + CO\uparrow \quad (1)$$

$$C + O_2 \rightarrow CO_2\uparrow \quad (2)$$

$$2C + O_2 \rightarrow 2CO\uparrow \quad (3)$$

$$C + CO_2 \rightarrow 2CO\uparrow \quad (4)$$

Therefore, $H_2O$, $CO_2$, $O_2$, $H_2$, etc. can be useful as substances reactive to the fibrous carbon.

Figure 2A:
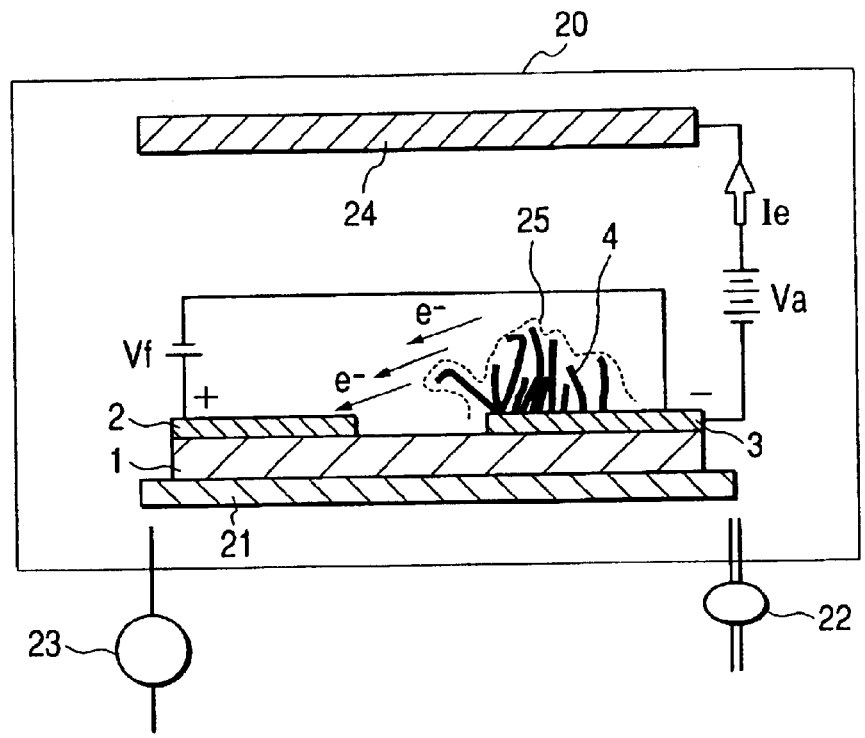
FIGS. 2A and 2B show a step of equalizing the shapes of fine projections among the electron-emitting devices according to an embodiment of the present invention.
Figure 2B:
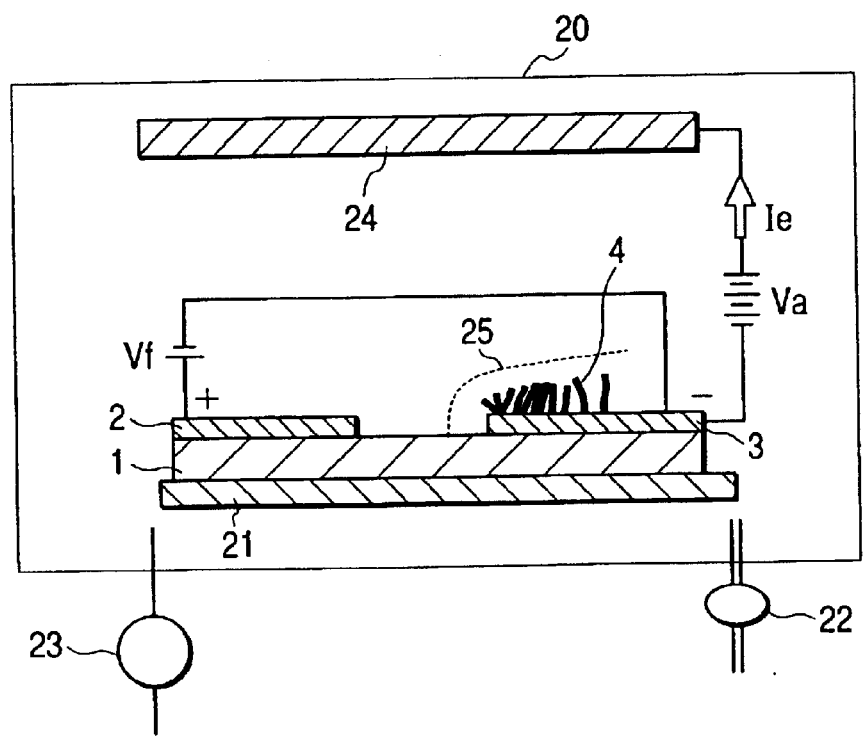

FIGS. 2A and 2B shows the type of the equalizing process according to the present invention using a lateral electron-emitting device in which fibrous carbon is used as an electron-emitting member.

In FIGS. 2A and 2B, reference numeral 1 denotes an insulating substrate, reference numeral 2 denotes a extracting electrode (also referred to as a "second electrode" or "gate electrode"), reference numeral 3 denotes a cathode electrode (also referred to as a "first electrode" or "negative electrode"), reference numeral 4 denotes an electron-emitting member comprising plural pieces of fibrous carbon electrically connected to the cathode electrode. Reference numeral 20 denotes a vacuum chamber, reference numeral 21 denotes a substrate holder, reference numeral 22 denotes a gas leading valve, reference numeral 23 denotes vacuum pump, reference numeral 24 denotes an anode (also referred to as a "third electrode"), and reference numeral 25 denotes an equipotential surface.

In this example, a lateral electron-emitting device is described, but the producing method according to the present invention is also applicable to a vertical electron-emitting device in which fibrous carbon is used as an electron-emitting member. Furthermore, since a lateral electron-emitting device is simpler in production, and smaller in capacity in the driving operation than the vertical electron-emitting device, a high-speed driving process can be performed.

Figure 12:
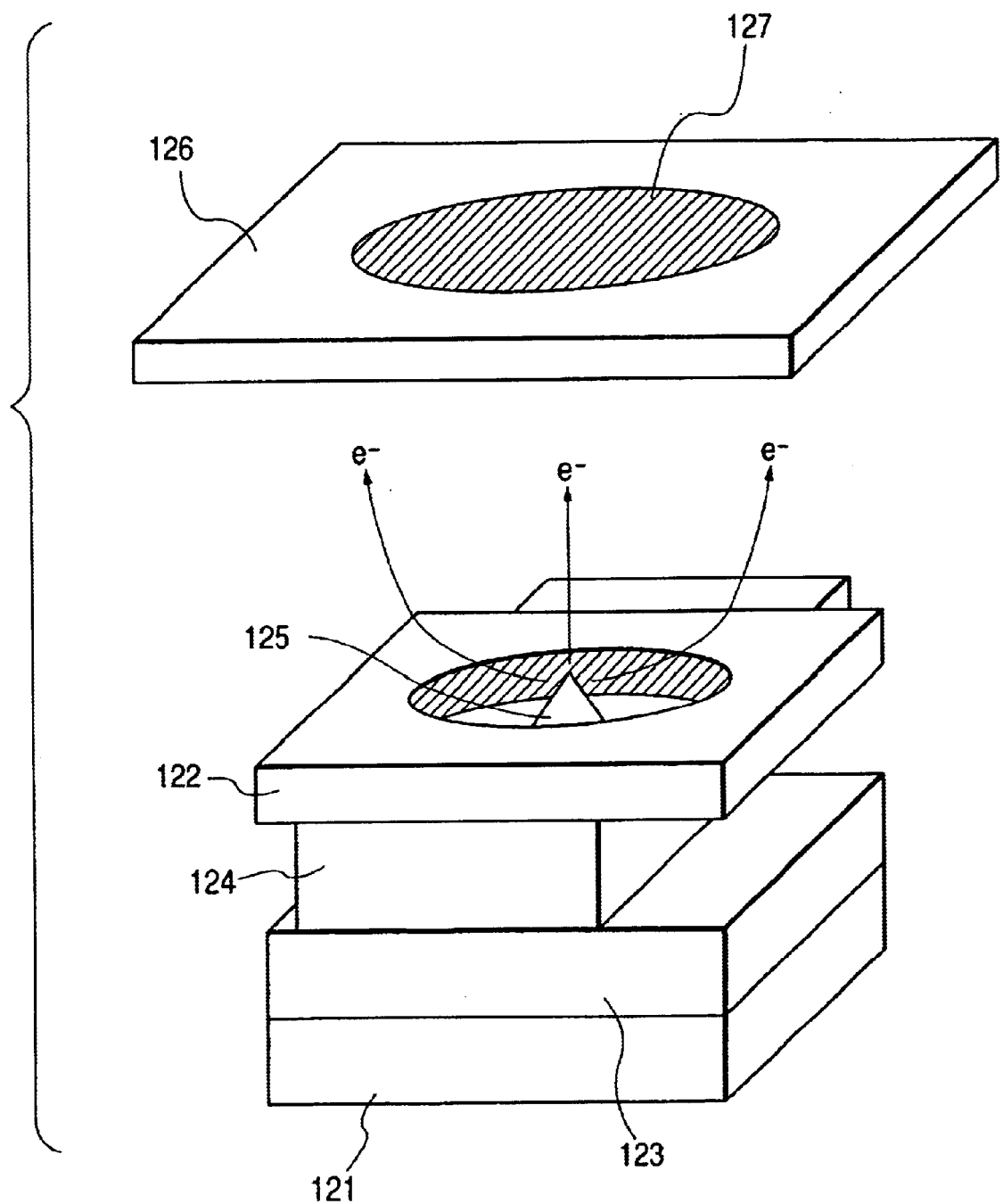
FIG. 12 shows the conventional vertical FE-type electron-emitting device.

Furthermore, although the vertical electron-emitting device shown in FIG. 12 includes a cathode electrode 123 and an extracting electrode (gate electrode) 125, the fibrous carbon can emit electrons in a low electric field. Therefore, the present invention can also be applied to a vertical electron-emitting device without a gate electrode 125 and an insulating layer 124 shown in FIG. 12. That is, the present invention can be applied to an electron-emitting device configured by the cathode electrode 123 provided on the substrate 121 and fibrous carbon provided thereon.

In the vertical electron-emitting device, an "equalizing process" can be performed by performing the voltage applying process similar to the process performed in the "equalizing process" described later, for applying the voltage between the cathode electrode (reference numeral 123 shown in FIG. 12) where the fibrous carbon is arranged and the anode (reference numeral 126 shown in FIG. 12). Otherwise, an "equalizing process" can also be performed by performing the process similar to the voltage applying process performed in the "equalizing process" described later, for applying the voltage between the extracting electrode (reference numeral 122 shown in FIG. 12) and the cathode electrode provided between the cathode electrode (reference numeral 123 shown in FIG. 12) where the fibrous carbon is arranged and the anode (reference numeral 126 shown in FIG. 12).

Furthermore, an "equalizing process" can also be performed by arranging an electrode plate above the cathode electrode where the fibrous carbon is provided, and performing a voltage applying process similar to the voltage applying process performed in the "equalizing process" described later between the electrode plate and the cathode electrode.

The "equalizing process" introduces an "reactive gas" reactive to the fibrous carbon from the gas leading valve 22 after evacuating the vacuum chamber 20 by the vacuum pump 23. Then, a voltage is applied to the electron-emitting member 4 of fibrous carbon such that the extraction electrode 2 can be positive, and an electron is emitted from the electron-emitting member 4 of fibrous carbon. Then, the electron-emitting member 4 of fibrous carbon proceeds with the above mentioned reaction toward right by means of the heat from the electron emission, etc., thereby etching the fibrous carbon (FIG. 2A).

During the process of the above mentioned reaction, the reactive gas on the right side is incessantly introduced by the gas leading valve 22, the product on the right is evacuated by the vacuum pump 23, and the above mentioned reaction expressions are proceeding right.

Since the reaction can be reciprocal, a reaction product is set to be immediately removed from the reaction system.

Furthermore, it is recommended to reserve the time to stop electron emission to promote the reaction between the reactive gas and the electron-emitting member. To attain this, it is desired that a pulse voltage is applied between the electron-emitting member 4 and the extraction electrode 2.

Since the reaction is driven by the heat from the electron emission, the portion of the electron-emitting member 4 easily emitting an electron (in which an electric field can be easily enhanced) reacts with concentration to the heat and then be etched in the set of fibrous carbon. As a result, the electric field can be equally applied by an electron emission area by removing the portion where the electric field has excessively been concentrated.

FIG. 2B shows the type of the result of the "equalizing process". After performing the "equalizing process", the electric field difference applied to each piece of fibrous carbon is reduced. That is, the equipotential surface 25 which is largely distorted as shown in FIG. 2A is reduced in distortion as shown in FIG. 2B.

When an image-forming apparatus is provided, etc., the "equalizing process" can also be performed after bonding an electron source substrate formed by a plurality of electron-emitting devices each having fibrous carbon and the wiring for use in driving the electron-emitting devices with a face plate having an image-forming member comprising a phosphor, etc., and forming a vacuum envelope (referred to as a sealing process).

In the above mentioned process, the performance of the electron-emitting device, electron source, and image-forming apparatus using plural pieces of fibrous carbon can be improved.

That is, the electron-emitting device according to the present invention prevents the local electric field concentration in the "equalizing process", thereby equalizing the electron emission characteristic, and suppressing the attenuation of the emission current by the overload from the high current density due to the local field concentration.

Therefore, the induction of discharge can be suppressed, the durability of the electron-emitting device can be elongated, and a stable electron emission current with small fluctuations with time can be maintained.

Then, since the electron emission current of each electron-emitting device can be stably maintained in the electron source and the image-forming apparatus including a plurality of electron-emitting devices, the durability of each pixel can be improved, the gray scale of an image can be successfully expressed, and the flicker of the image can be avoided, thereby expressing equal display characteristic for a long period.

Described below is an embodiment of the practical configuration according to the present invention.

Figure 3A:
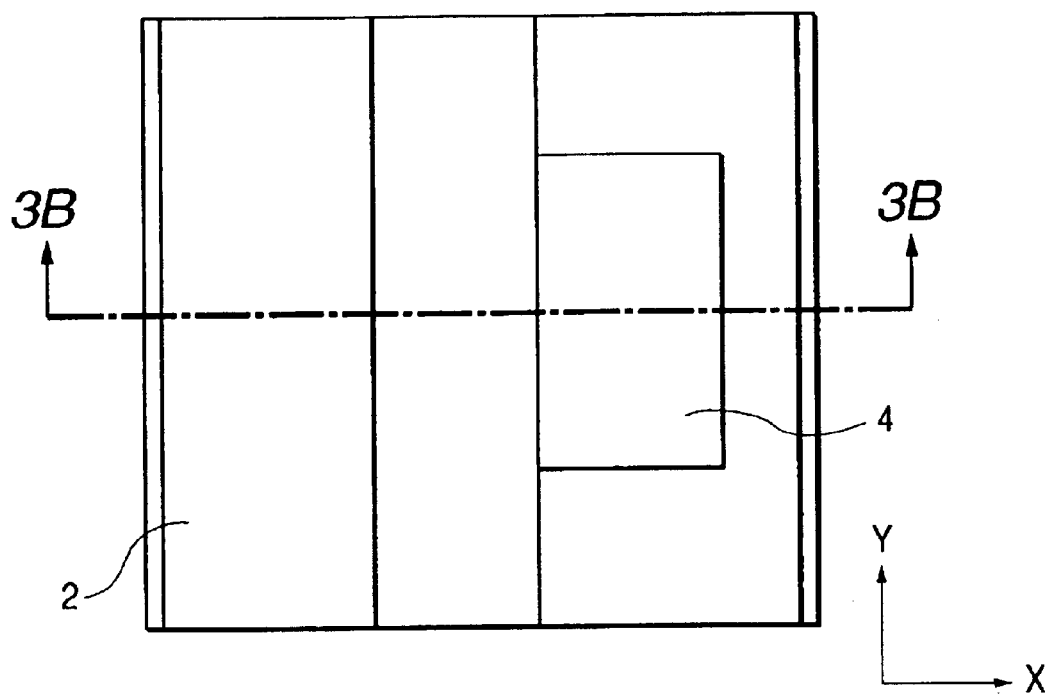
FIGS. 3A and 3B show an electron-emitting device according to the embodiment of the present invention.
Figure 3B:
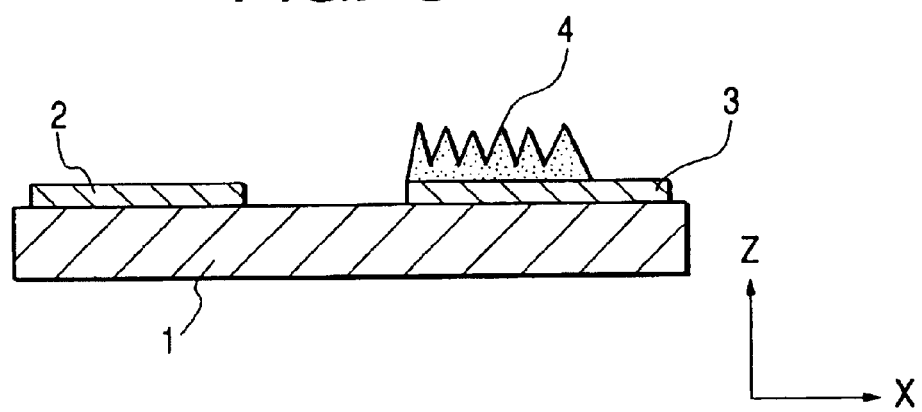

FIGS. 3A and 3B show an example of the configuration of the electron-emitting device on which the producing method according to the present invention works. FIG. 3A is a plan view of the electron-emitting device according to the present embodiment. FIG. 3B is a sectional view along 3B—3B shown in FIG. 3A.

In FIGS. 3A and 3B, reference numeral 1 denotes a substrate, reference numeral 2 denotes an extracting electrode, reference numeral 3 denotes a cathode electrode, and reference numeral 4 denotes an electron-emitting member. FIGS. 4A to 4D schematiclly show a type of the method of producing an electron-emitting device according to the present embodiment. An example of the method of producing an electron-emitting device according to the present embodiment is described below by referring to FIGS. 4A to 4D.

Figure 4A:
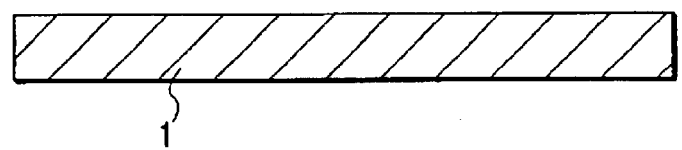
FIGS. 4A, 4B, 4C and 4D show the step of producing the electron-emitting device according to the embodiment of the present invention.

The substrate 1 refers to quartz glass, glass whose impure contents such as Na, etc. are reduced and replaced with K, etc., sodalime glass, a layer structure obtained by applying $SiO_2$ on the silicon substrate, etc. in the spatter method, etc., and an insulating substrate such as ceramics, etc. of alumina, etc. (FIG. 4A).

Figure 4B:
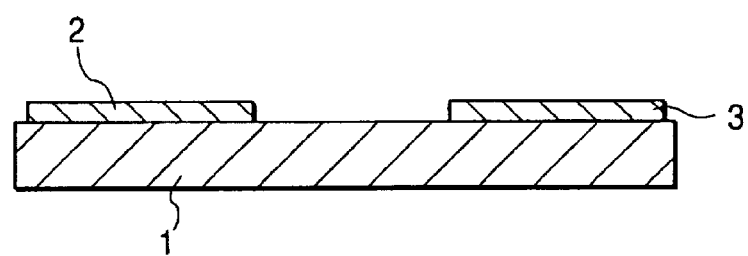

The extraction electrode (gate electrode) 2 and the cathode electrode 3 are disposed on the insulating substrate 1 (FIG. 4B).

The extraction electrode 2 and the cathode electrode 3 are conductive, and can be formed by the common vacuum film-forming technology such as the evaporation method, the spatter method, etc. and the photolithography technology.

The material of the extraction electrode 2 and the cathode electrode 3 can be, for example, carbon, metal, metal nitride, metal carbide, metal boride, semiconductor, or metal compound semiconductor.

The thickness of the electrodes 2 and 3 can be set in the range from several tens nm to several $\mu$m. It is desired to use such a heat resistant material as carbon, metal, metal nitride, metal carbide, etc. If the potential can be reduced due to a thin electrode, or if the electron-emitting device is used in a matrix array, then a low resistance metal wiring material can be used in a portion not involved in the electron emission as necessary.

The distance between the extraction electrode 2 and the cathode electrode 3 can be determined depending on the device voltage driving the electron-emitting device between the extraction electrode 2 and the cathode electrode 3 such that the electron emission field can be one through ten times larger than the vertical field when the electron emission field (lateral field) of the electron-emitting member 4 is compared with the vertical field required to form an image.

For example, when the distance between the anode 24 (FIG. 2A) and the cathode electrode 3 is 2 mm, and 10 kV is applied, the vertical field is 5 V/$\mu$m. In this case, the distance and the device voltage are to be determined such that the electron emission field of the electron-emitting member to be used is larger than 5 V/$\mu$m, and corresponds to be the selected electron emission field.

The "lateral field" according to the present invention can be referred to as a "electric field practically parallel to the surface of the substrate 1", or a "electric field in the direction of the extraction electrode 2 opposite the cathode electrode 3.

Figure 6:
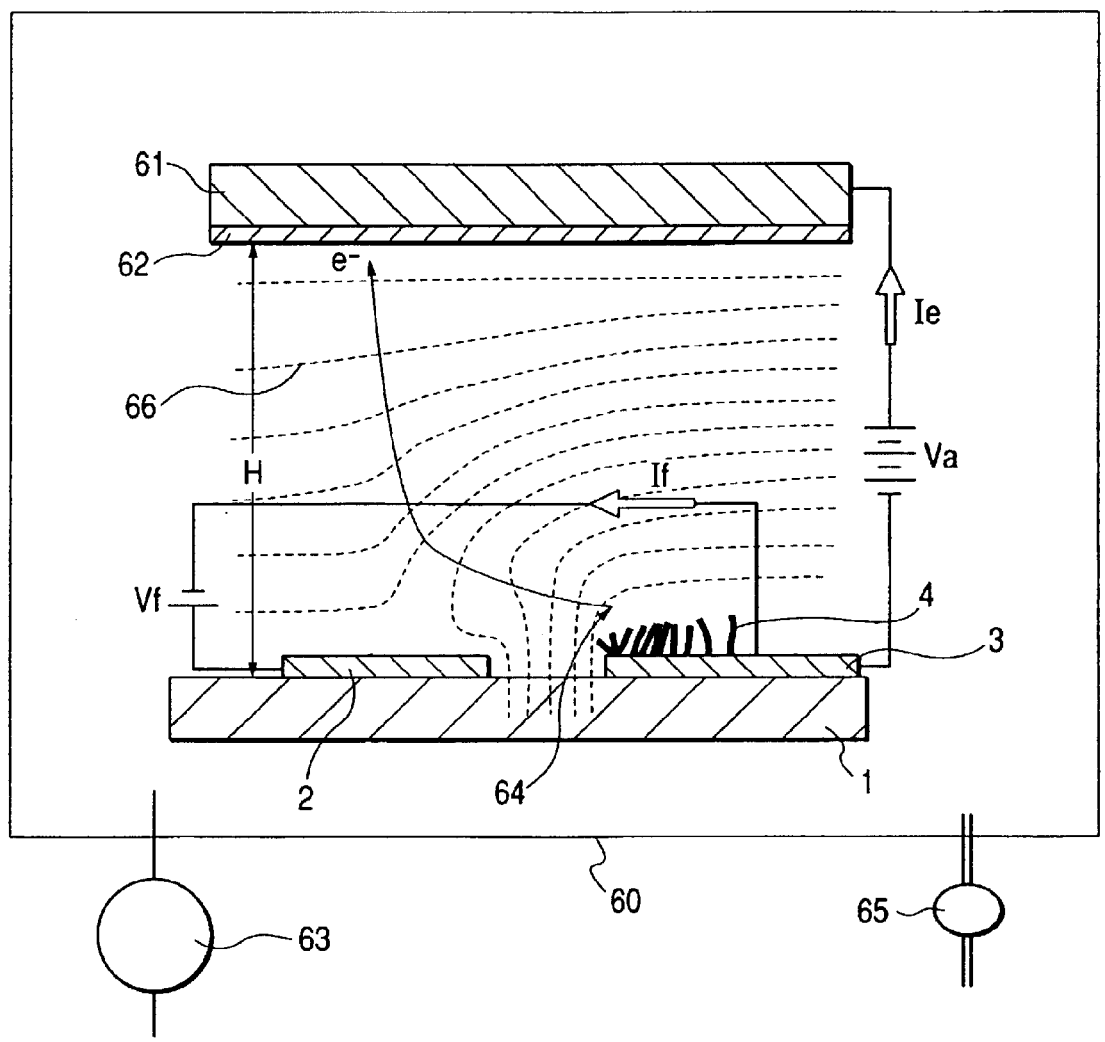
FIG. 6 shows an example of the configuration when an electron-emitting device is operated.

The "vertical field" according to the present invention refers to an "electric field in the direction substantially perpendicular to the surface of the substrate 1", or an "electric field in the direction of the substrate 1 opposite an anode electrode 61" (FIG. 6).

Figure 4C:
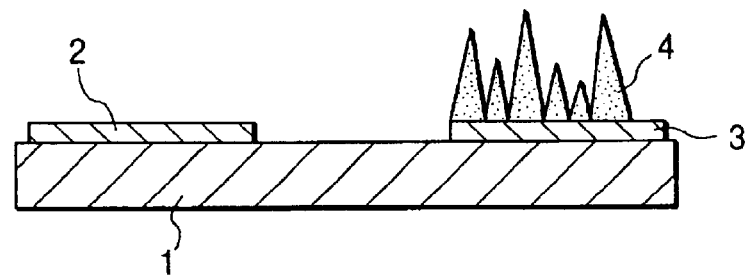

Then, the electron-emitting member 4 having an uneven surface is disposed on the cathode electrode 3 (FIG. 4C). The material used as the electron-emitting member 4 is a set of fibrous carbon. It is desired that the fibrous carbon is graphite fiber.

Figure 10:
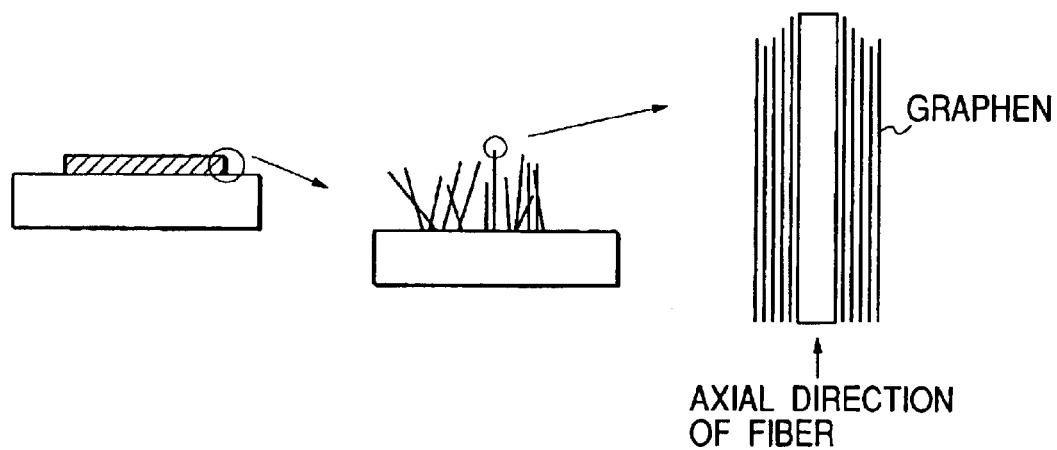
FIG. 10 shows the outline of the structure of a carbon nanotube.
Figure 11:
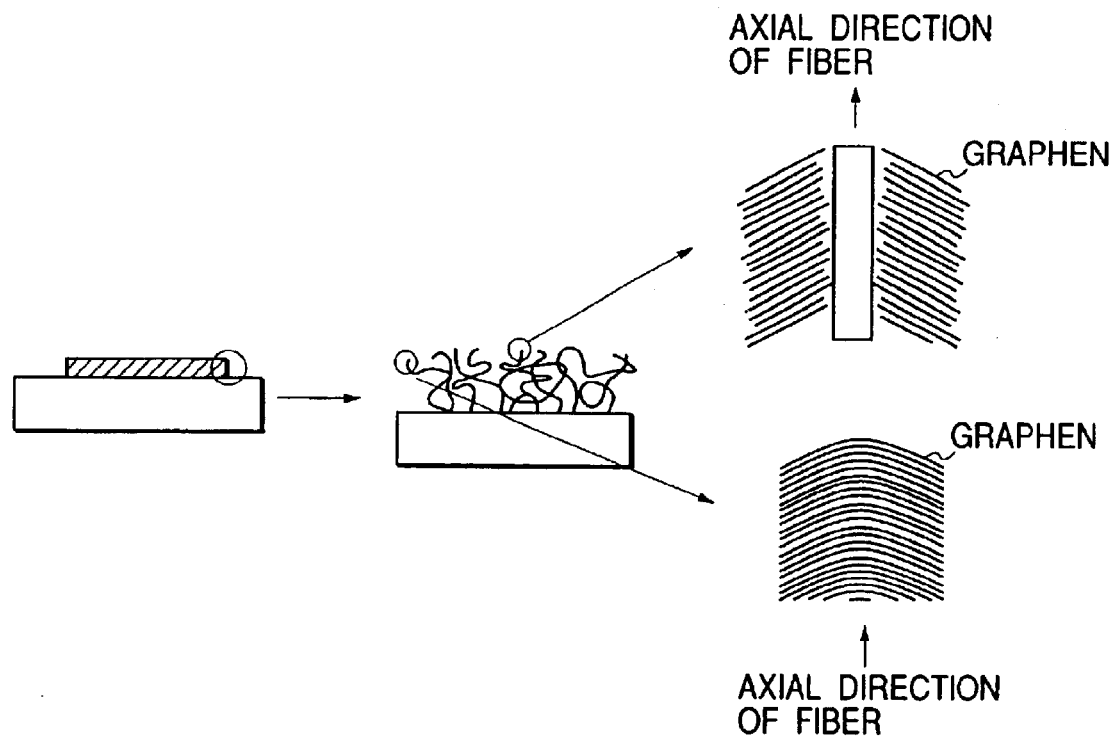
FIG. 11 shows the outline of the structure of a graphite nanofiber.

The above mentioned fibrous carbon has a threshold field of several V/$\mu$m. FIGS. 10 and 11 show an example of configurations of fibrous carbon suitable for the present invention. Each figure shows an embodiment at an optical microscope level (approximately 1000×) on the left, an embodiment at a scanning electronic microscope (SEM) level (approximately 30,000×) in the center, and an embodiment at a transmission electronic microscope (TEM) level (approximately 1 millions) on the right.

As shown in FIG. 10, a cylindrical shape of graphen (multiple wall cylinder is referred to as a multiwall nanotube) is referred to as a carbon nanotube, and its threshold is the smallest when the tip of the tube is opened.

FIG. 11 shows the fibrous carbon may be produced at a relatively low temperature. A fibrous carbon of this form is comprised of a lamination of graphens (which is thus sometimes called "graphite nanofiber" and the ratio of the amorphous structure of which increases depending on the temperature). To be more practical, the graphite nanofiber indicates a fibrous substance in which graphens are layered (laminated) in the longitudinal direction (axial direction of fiber). That is, as shown in FIG. 11, it is a fibrous substance in which plurality of graphens are arranged and layered (laminated) so as not to be parallel to the axis of the fiber.

The other carbon nanotube is a fibrous substance in which graphens are arranged (in cylindrical shape) around the longitudinal direction (axial direction of fiber). In other words, it is a fibrous substance in which graphens are arranged substantially in parallel to the axis of the fiber.

One sheet of graphite is referred to as a "graphen" or a "graphen sheet". To be more practical, graphite is obtained by laying plural carbon sheets, a lamination in which carbon planes, each of which is a spread of regular hexagons consisting of covalent bonds of carbon atoms in $sp^2$ hybrid, are layered at intervals of distance of 3.354 Å. Each of the carbon planes is called a "graphen" or a "graphen sheet".

Either fibrous carbon has an electron emission threshold of 1 V to 10 V/$\mu$m and is recommendable as the material of the emitter (electron-emitting member) 4.

Especially, an electron-emitting device using a set of graphite nanofiber is not limited to the device structure according to the present invention shown in FIGS. 2 and 3, but can emit electrons in a low electric field, can obtain a large emission current, can be easily produced, and obtains an electron-emitting device having a stable electron emission characteristic. For example, a graphite nanofiber emitter is used, an electron-emitting device can be obtained by preparing an electrode for controlling the electron emission from the emitter, and a light emitting apparatus such as a lamp, etc. can be formed using a light emission member emitting light by the irradiation of an electron emitted from a graphite nanofiber. Furthermore, by arranging plural arrays of electron-emitting devices using the above mentioned graphite nanofiber and by preparing an anode electrode comprising a light emission member such as a phosphor, etc., an image-forming apparatus such as a display, etc. can be configured. An electron-emitting device, a light emitting device, and an image-forming apparatus using graphite nanofiber can stable emit electrons without keeping the inside of each device in a vacuum state as in the conventional electron-emitting device. Furthermore, since electrons can be emitted in a low field, a reliable device can be easily produced. As a result, the producing method according to the present invention is more recommendable in the device using the graphite nanofiber.

The above mentioned fibrous carbon can be formed by decomposing the hydrogen carbide gas using a catalyst (a material for promoting the pile of carbon). The carbon nanotube and the graphite nanofiber depend on the type of catalyst and the temperature of decomposition.

As the catalyst material, Fe, Co, Pd, Ni, or an alloy of any of the selected materials can be used as the nucleus forming the center of the fibrous carbon.

In particular, Pd, Ni may be material for generating graphite nanofiber at a low temperature (400° C. or more). The temperature at which the carbon nanotube is generated using Fe or Co is over 800° C. while the graphite nanofiber material can be generated at a low temperature. Therefore, it is desired from the viewpoint of the influence on other members and the production cost to generate graphite nanofiber material using Pd and Ni.

Furthermore, relating to Pd, using the characteristic of an oxide which is reduced at a low temperature (room temperature), paradium oxide can be used as a nucleus forming material.

When a hydrogen reduction process is performed on a paradium oxide, a fast condensation nucleus can be formed at a relatively low temperature (200° or lower) without thermal condensation of a thin metal film or generation and evaporation of super-particle conventional used as common nucleus forming technology.

The above mentioned hydrogen carbide gas can be, for example, ethylene, methane, propane, propylene, CO, $CO_2$ gas, or vapor of an organic solvent such as ethanol, acetone, etc.

Furthermore, the present invention can be applicable to any electron-emitting member 4 having an uneven surface as shown in FIG. 4C. The material of the electron-emitting member 4 having an uneven surface can be a heat-resistant material such as W, Ta, Mo, etc., a carbide such as TiC, ZrC, HfC, TaC, SiC, WC, etc., a boride such as $HfB_2$, $ZrB_2$, $LaB_6$, $CeB_6$, $YB_4$, $GdB_4$, etc., a nitride such as TiN, ZrN, HfN, etc., a semiconductor such as Si, Ge, etc., carbon and carbon compound, etc. containing diffused amorphous carbon, graphite, diamond-like carbon, and diamond.

Such a electron-emitting member 4 having an uneven surface can be obtained by either the process of generating projections using a method of the RIE, etc. from a film piled in the common vacuum film-forming method, etc. such as the spatter method, etc. or the process of growing a pin-shaped crystal through the generation of a nucleus in the CVD, growing a whisker-shaped crystal, etc.

The control of the shape of the projections depends on the type of substrate to be used, the type of gas, the pressures of a gas (flow rate), an etching time, the energy when plasma is formed, etc. On the other hand, in the CVD forming method, control is performed based on the type of substrate, the type of gas, the flow rate, the growing temperature, etc.

Regardless of the relation to the electron emission, the area in which the electron-emitting member 4 is placed is referred to as an "electron emission area" according to the present invention.

Figure 4D:
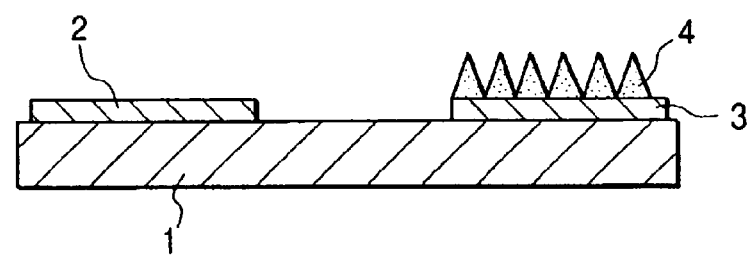

Then, the above mentioned electron-emitting member 4 is partially etched, and the "equalizing process" increasing the number of emission sites is performed (FIG. 4D).

After the electron-emitting device is provided in the vacuum chamber 20 as shown in FIGS. 2A and 2B, and the vacuum chamber 20 is evacuated by the vacuum pump 23, the gas leading valve 22 introduces a substance chemically or physically reactive to the electron-emitting member 4.

A chemically reactive substance can be the above mentioned $O_2$, CO, $H_2O$, $H_2$, etc. when the electron-emitting member 4 is carbon (fibrous carbon). It is preferable that the gas chemically reactive to the fiber is a mixed gas of a gas selected from among $H_2O$, $O_2$, $CO_2$ and $H_2$ gasses.

A substance physically reactive refers to a substance which can be an electrified particle when an electron beam crashes, and it is desired to have a substance having a large mass such as Ar, etc. The introduction pressure of a gas of the above mentioned substance depends of the type of gas. However, when the substance is chemically reactive, it is $1\times10^{-4}$ Pa or over. When the substance is physically reactive, it is approximately $1\times10^{-6}$ to $1\times10^{-4}$ Pa.

If potential is applied to the electron-emitting member 4 of the electron-emitting device such that the extraction electrode 2 of the electron-emitting device can be positive, and an electron is emitted after introducing the above mentioned gas, then the above mentioned gas is reactive to the electron-emitting member 4 to etch the electron-emitting member 4.

In this step in the electron emission area, a portion in which electrons can be easily emitted (an electric field can be easily enhanced) becomes reactive and etched with concentration, a portion in which an electric field has excessively concentrated can be removed, and the field can be more equally applied to the electron emission area.

FIGS. 2A and 2B show the type of this process. FIG. 2A shows the type of the device when the "equalizing process" is started, and FIG. 2B shows the type of the device after performing the "equalizing process".

When an image-forming apparatus is formed, this step can also be performed by: bonding the electron source substrate on which wiring, etc. is arranged for an electron-emitting device to the face plate having an image-forming member comprising a phosphor, etc.; introducing the reactive gas after forming an envelope (referred to a sealing step); and applying positive potential to the anode in the electron emission area.

Thus, an electron-emitting device according to the present embodiment can be formed.

The electron-emitting device and its operation obtained in the above mentioned steps are described below by referring to FIGS. 6 and 7. An electron-emitting device having a gap of several μm between the extraction electrode 2 and cathode electrode 3 is provided in a vacuum chamber 60 as shown in FIG. 6 to allow a vacuum pump 63 to completely perform an evacuation until achieving a pressure of about $10^{-5}$ Pa, the anode electrode 61 is provided at the height of H, which if several mm from the substrate 1, using a high voltage as shown in FIG. 6, and an anode voltage Va, that is, a high voltage of several kV, is applied between the cathode electrode 3 and the anode electrode 61.

A phosphor 62 coated with a conductive film is provided on the anode electrode 61.

A device voltage Vf of a pulse voltage of several tens V is applied between the extraction electrode 2 and the cathode electrode 3 to measure a flowing device current If and an electron emission current Ie.

At this time, an equipotential line 66 is formed as shown in FIG. 6, and the point at which an electric field concentrates is located closest to the anode 61 of the electron-emitting member 4 indicated by 64, and inside the gap.

It is assumed that an electron is emitted from the electron-emitting member 4 located near the electric field concentration point 64.

Figure 7:
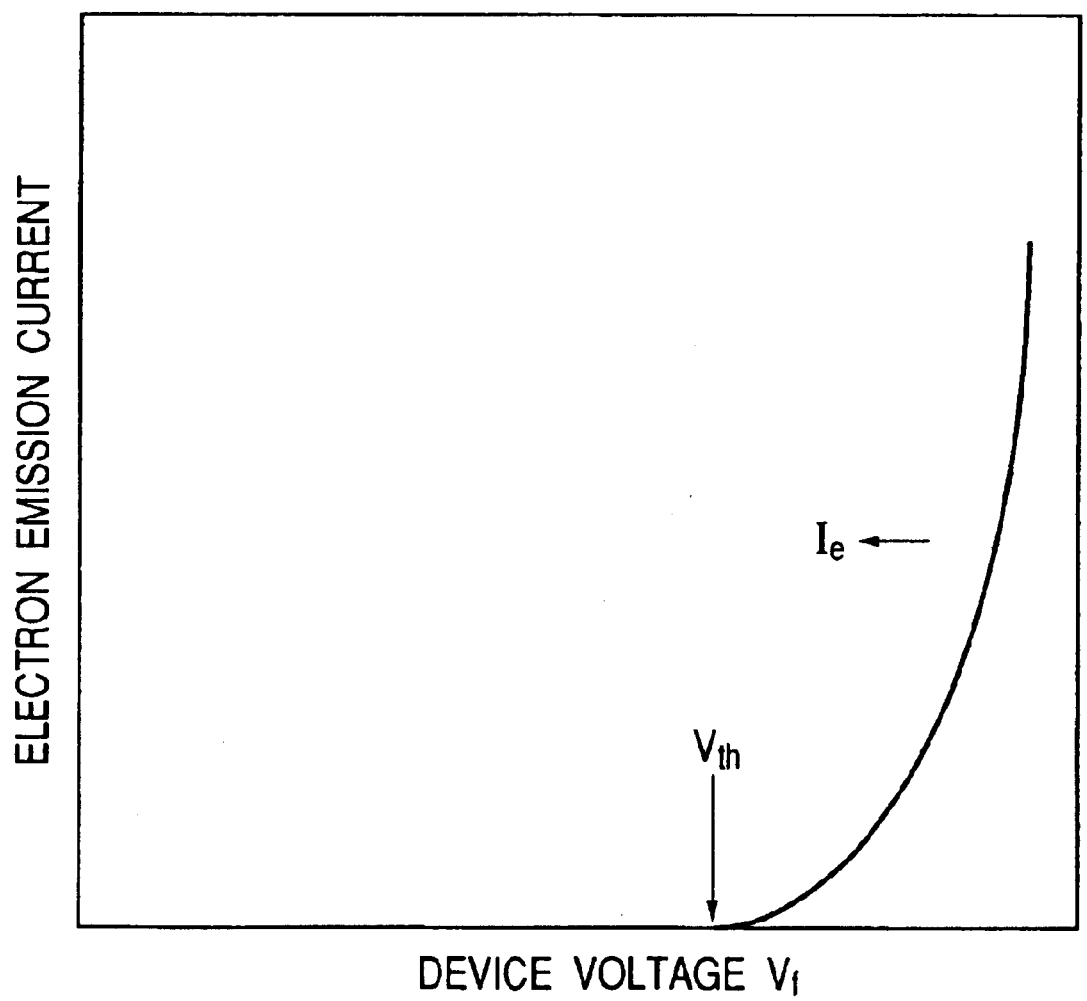
FIG. 7 shows an example of the operation characteristic of an electron-emitting device according to the embodiment of the present invention.

As shown in FIG. 7, the characteristic of the electron emission current Ie of the electron-emitting device shows Ie suddenly rising about half of the applied voltage (device voltage Vf), If having the characteristic similar to that of Ie, but having a sufficiently smaller value than Ie.

Furthermore, Ie observed when the electron-emitting member 4 is destroyed, etc. due to the local field concentration on the electron-emitting member 4 has not suddenly fluctuated.

Figure 5A:
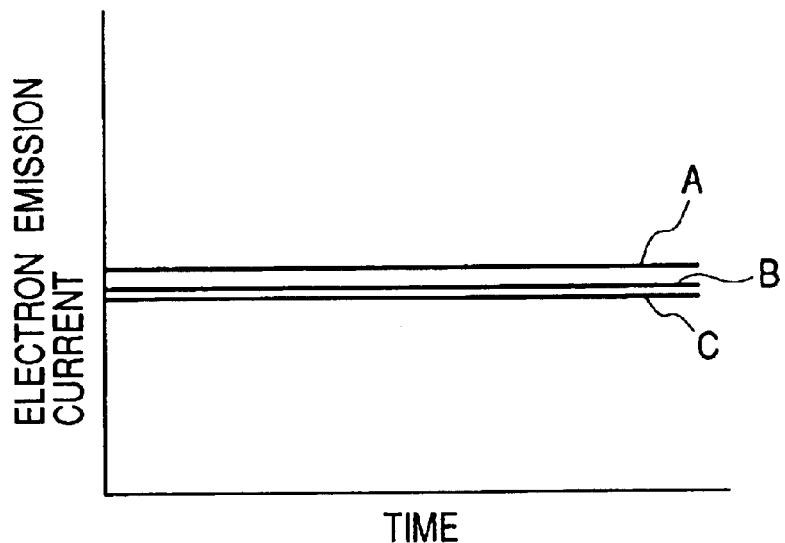
FIGS. 5A and 5B show a change with time of an emission current of an electron-emitting device.

FIG. 5A shows the Ie fluctuation when each of the devices A, B, and C according to the present embodiment produced in the same producing method is driven with Vf, Va, and H set constant. It proves that the three devices A, B, and C indicate small fluctuation, and have similar Ie values.

Figure 5B:
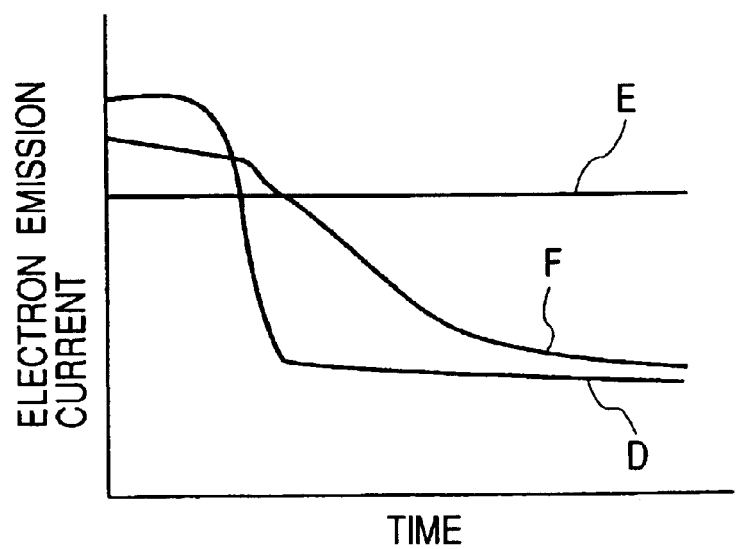

For comparison, FIG. 5B shows the fluctuation of Ie (emission current) when each of the devices D, E, and F produced in the same producing method except omitting the equalizing process (shown in FIG. 4D) by the electron-emitting member 4 is driven. In the device D, a sudden drop of Ie is observed in the driving period. In the device F, Ie is stepwise reduced, and indicates a saturation tendency at a certain value. Ie of the device E is stable.

Thus, without performing the "equalizing process", the characteristic of devices are unequal because the devices have different portions where an electric field easily concentrates due to different configurations of fibrous carbon which is an electron-emitting member.

Figure 14:
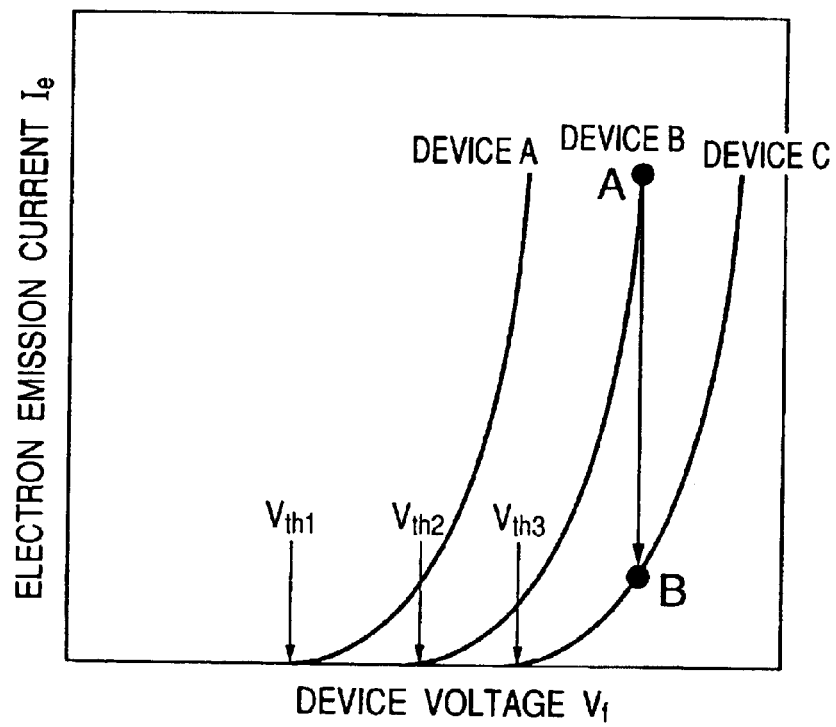
FIG. 14 shows the type of another equalizing process according to the present invention.

Listed below are examples of three devices (A, B, and C), and described below is an example of an equalizing process among a number of devices according to the present invention. FIG. 14 shows electron emission characteristics of different devices A to C before the "equalizing process".

In this example, the threshold $V_{th3}$ of the electron emission is largest for the device C, and the threshold $V_{th1}$ of the electron emission is smallest for the device A.

When the device A is driven with a pulse voltage under the condition of the above mentioned reactive gas, the mechanism of the above mentioned chemical etching of carbon suddenly reduces the electron emission current of the device A. The process is performed with the voltage applied to the device A gradually increased until the electron emission cannot be substantially detected when the threshold voltage ($V_{th3}$) of the device c is obtained. Similarly, the process is performed on the device B until the current value is reduced from the value indicated by the point A shown in the figure to the value indicated by the point B.

Thus, if the characteristic of each device is evaluated under the condition after the reactive gas has been evacuated, the electron emission characteristics of the devices A and B can substantially match the electron emission characteristic of the device C.

A preferable method as the "equalizing process" among a number of devices is described below. The preferable method comprising the steps of: find the electron-emitting device whose threshold voltage required to emit an electron is determined to be low with the characteristic of other devices, and then make the threshold voltages of the other devices becomes closer to the threshold of the device whose threshold voltage is determined to be low with the other devices.

Figure 8:
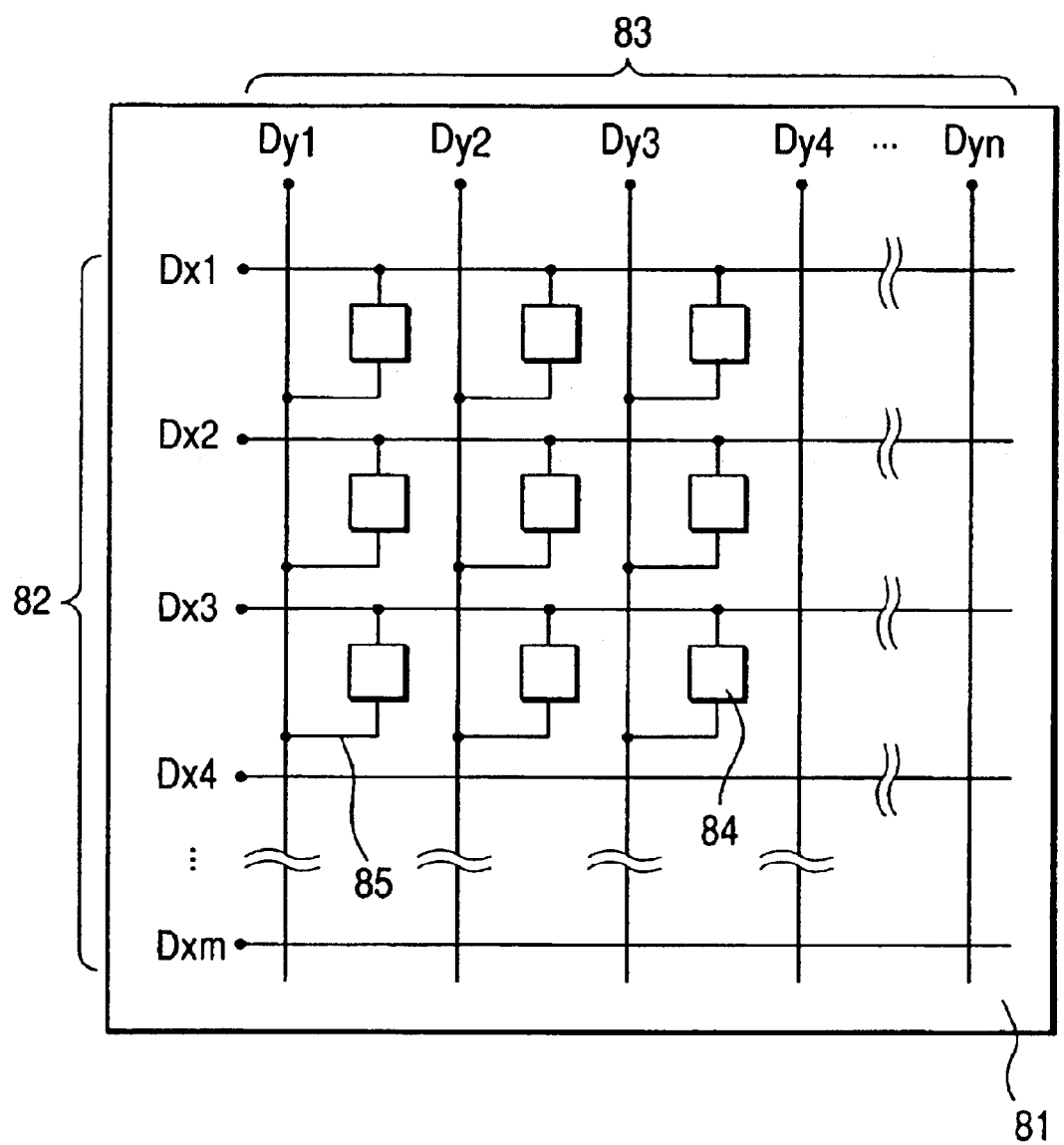
FIG. 8 shows an example of the configuration of a simple matrix circuit according to the embodiment of the present invention.

An example of the method for performing the equalizing process on an electron source for which a plurality of electron-emitting devices are provided is described below by referring to FIG. 8 based on the above mentioned principle. In FIG. 8, reference numeral 81 denotes an electron source substrate, reference numeral 82 denotes X direction wiring, reference numeral 83 denotes Y direction wiring, reference numeral 84 denotes an electron-emitting device, and reference numeral 85 denotes a connection line.

X direction wiring 82 is formed by m pieces of wiring, that is, Dx1, Dx2, . . . , Dxm, and can be configured by conductive metal, etc. formed in the vacuum evaporation method, the printing method, the spattering method, etc. The material, the film thickness, the width of the wiring can be appropriately designed.

The Y direction wiring 83 is formed by n pieces of wiring, that is, Dy1, Dy2, . . . , Dyn, which is similarly formed in the X direction wiring 82.

Among the m pieces of X direction wiring 82 and n pieces of Y direction wiring 83, an inter-layer insulation layers (not shown in the attached drawings) for separating them, which layers separate both electrically.

The inter-layer insulation layer not shown in the attached drawings is configured by $SiO_2$, etc. formed in the vacuum evaporation method, the printing method, the spattering method, etc. For example, it is formed in a desired shape on all or a part of the electron source substrate 81 on which the X direction wiring 82 is arranged. Its film thickness, material, and producing method are appropriately designed to stand the potential difference at the crossing portion between the X direction wiring 82 and the Y direction wiring 83.

The X direction wiring 82 and the Y direction wiring 83 are led as external terminals.

A pair of electrodes (not shown in the attached drawings) forming the electron-emitting device 84 are electrically connected by m pieces of the X direction wiring 82, n pieces of the Y direction wiring 83, and the connection line 85 comprising conductive metal, etc.

When the number of rows in the X direction and the number of columns in the Y direction increase in the simple matrix as shown in FIG. 8, there occurs apparent distribution of the voltage applied to each device due to a drop of voltage if the "equalizing process" is collectively performed by selecting all of the electron-emitting devices 84 in the matrix. For example, it is desired that the "equalizing process" is performed with line (wiring) by line (wiring) or the "equalizing process" is performed with one by one (dot sequentially).

In this embodiment, an example of the equalizing process performed on all electron-emitting devices is described. However, the equalizing process can be performed not on all electron-emitting devices, but only on a desired electron-emitting device.

Before performing the equalizing process, it is desired that the electric characteristic of the electron-emitting device 84 is measured. It can be determined how the electric characteristic of each electron-emitting device can be set based on the data obtained in the measurement. The electric characteristic to be measured (monitored) is obtained by measuring the current occurring when a predetermined voltage is applied to each electron-emitting device or between the electron-emitting device and the anode.

A current occurring in an electron-emitting device can be a current flowing between an extraction electrode and a cathode electrode when a predetermined voltage is applied between the extraction electrode and the cathode electrode of each electron-emitting device. A current occurring between the anode electrode and the electron-emitting device can be a current detected when a current flowing to anode (emission current from the electron-emitting device) when a predetermined voltage is applied between the anode electrode and the electron-emitting device.

It is desired that the measurements of the electric characteristic are made on all electron-emitting devices. However, when the number of electron-emitting device increases, measurements can be made only on limited devices, and the "equalizing process" can be performed based on the measurement value.

To have the electric characteristics of all electron-emitting devices close to a predetermined value range based on the measured electric characteristic, it is desired to perform the "equalizing process" on all electron-emitting devices. However, if the electric characteristics of devices are not quite different from each other, the "equalizing process" can be performed only on the electron-emitting device having the characteristic out of the desired range.

Described below is the above mentioned method of sequentially equalizing lines. For example, the "equalizing process" is performed by commonly connecting (for example, a GND connection) n pieces of Y direction wiring, that is, Dy1, Dy2, . . . , Dyn, applying positive potential to the Y direction wiring to Dx1 of the X direction wiring, and selecting the electron-emitting device at the row Dx1 (electron-emitting device connected to the wiring of Dx1) 84. Then, a similar voltage is applied to Dx2, the electron-emitting device at the row Dx2 is selected, and the "equalizing process" is performed. Similarly, the rows Dx3, Dx4, . . . , Dxm are sequentially selected, and the equalizing process is performed in the X direction in a line sequence. Thus, the influence of a voltage drop can be reduced. In this embodiment, the "equalizing process" is performed on all electron-emitting devices connected to one piece of X direction wiring. However, the "equalizing process" can be performed on some of the electron-emitting devices connected to one pieces of the X direction wiring. That is, the "equalizing process" is not performed on all electron-emitting devices, but can be performed only on desired electron-emitting devices.

Then, in the "equalizing process" sequentially performed one (device) by one (device), each device is selected using the above mentioned matrix wiring using the above mentioned matrix wiring so that it can be independently driven, and the electron-emitting device 84 can be individually equalized. In this method, there is no influence of a voltage drop, but the time required to perform the process is proportional to the number of the devices. Therefore, any of the line sequence process, the point sequence process, and a collective process can be performed depending on the size or the use of an electron source. Also in this method, the equalizing process is not performed on all electron-emitting devices, but is performed only on desired electron-emitting devices.

Figure 9:
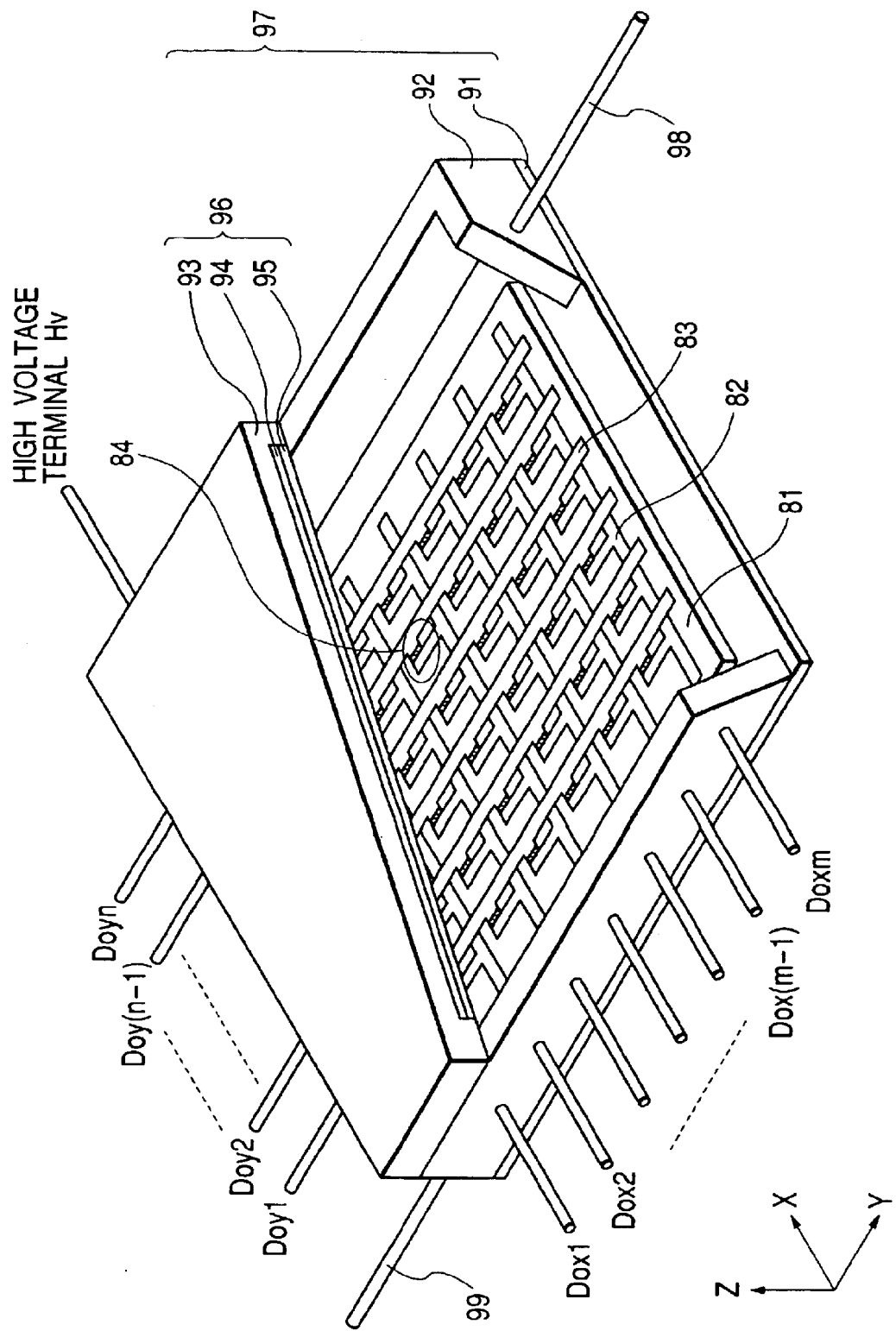
FIG. 9 shows an example of the configuration of an image-forming apparatus using the electron source according to the embodiment of the present invention.

Described below is the image-forming apparatus configured using the electron source of the above mentioned simple matrix by referring to FIG. 9. FIG. 9 shows a type of an example of the display panel of the image-forming apparatus.

In FIG. 9, reference numeral 81 denotes an electron source substrate 81 for which a plurality of electron-emitting devices are provided, reference numeral 91 denotes a rear plate to which the electron source substrate 81 is fixed, reference numeral 96 denotes a face plate in which a fluorescent film 94, a metal back 95, etc. are formed inside a glass substrate 93. Reference numeral 92 denotes a support frame to which the rear plate 91 and the face plate 96 are bonded using frit glass, etc. Reference numeral 97 denotes an envelope can be formed and sealed by baking at the temperature of 400 to 500° C. for over 10 minutes in the vacuum or nitrogen.

As described above, the envelope 97 comprises the face plate 96, the support frame 92, and the rear plate 91. Since the rear plate 91 is provided mainly to reinforce the strength of the electron source substrate 81, the separate rear plate 91 is not required if the electron source substrate 81 itself is strong enough. That is, the support frame 92 can be bonded directly to the electron source substrate 81 so that the face plate 96, the support frame 92, and the electron source substrate 81 can configure the envelope 97. On the other hand, a support unit, referred to as a spacer, not shown in the attached drawings can be provided between the face plate 96 and the rear plate 91 to configure the envelope 97 durable against the atmosphere.

Furthermore, the "equalizing process" of the electron-emitting member 4 according to the present embodiment can be performed by introducing a reactive gas using a gas lead tube 98 after forming the envelope 97. The lead gas and the reaction product can be removed at any time by an evacuation tube 99.

The image-forming apparatus according to the present embodiment can also be used as an image-forming apparatus, etc. as a display device such as a device for a television broadcast, video conference system, a computer, etc. and an optical printer configured by a photosensitive drum, etc.

(Embodiments)

Described below in detail are practical embodiments according to the present invention.

(First Embodiment)

As the first embodiment of the present invention, an electron is emitted between the cathode electrode and the extraction electrode of the electron-emitting device under the condition of an $O_2$ gas, and the "equalizing process" is performed. FIGS. 1A to 1E show a method of producing an electron-emitting device according to the present embodiment. FIGS. 3A and 3B are a plan view and a sectional view of the produced electron-emitting device. Described below is the step of producing the electron-emitting device according to the present embodiment.

(Step 1 (FIG. 1A))

A quarts substrate is cleaned and used as the substrate 1. 5 nm thick Ti and 30 nm thick Pt area are continuously evaporated in the spatter method as the extraction electrode 2 and the cathode electrode 3.

Then, in the photolithography process, a resist pattern is formed using a positive type photoresist (AZ 1500 made by Clariant).

Next, the Pt layer and Ti layer dry etching processes are performed using Ar with the patterned photoresist as a mask, and the extraction electrode 2 and the cathode electrode 3 having the gap of 5 µm between the electrodes are formed.

(Step 2 (FIG. 1B))

Then, about 100 mm thick Cr is piled in the evaporating process. In the photolithography process, a resist pattern is formed using a positive type photoresist (AZ 1500 made by Clariant).

Next, using the patterned photoresist as a mask, the area (100 μm square) for coating the electron-emitting member 4 is formed on the cathode electrode 3, and the Cr of an aperture is removed by a cerium nitrate etching solution.

After removing the photoresist, a complex solution obtained by adding a Pd complex to isopropyl alcohol, etc. is applied by a spin coat.

After the application, a heat treatment is performed at 300° C. in the atmosphere, about 10 nm thick palladium oxide 41 is formed on the cathode electrode 3, and then Cr is removed by the cerium nitrate etching solution.

(Step 3 (FIG. 1C))

The atmosphere is evacuated with the heat of 200° C., the heat treatment is performed in the flow of the 2% hydrogen diluted by nitrogen. At this step, an about 3 to 10 nm diameter particle 42 is formed on the surface of the cathode electrode 3. At this time, the density of the particle 42 is estimated to be about $10^{11}$ to $10^{12}/cm^2$.

(Step 4 (FIG. 1D))

Then, in the flow of 0.1% ethylene diluted by nitrogen, the heat treatment is performed at 500° C. for 10 minutes. When this process is observed by a scanning electronic microscope, it proves that a number of pieces of fibrous carbon 43 extending as 10 to 25 nm diameter curving fiber are formed on the Pd coated area. At this time, the fibrous carbon 43 is about 500 nm thick.

(Step 5 (FIG. 1E))

Then, a device is provided in the vacuum device 20 shown in FIGS. 2A and 2B, the vacuum pump 23 performs the evacuation up to $1\times10^{-5}$ Pa, the gas leading valve 22 leads an $O_2$ gas until the vacuum level in the vacuum device 20 reaches $1\times10^{-4}$ Pa, and a pulse voltage is applied to the cathode electrode 3 with the extraction electrode 2 set positive. The system is driven for 1 hour in this state, and the electron-emitting member 4 is equalized.

The electron-emitting device is formed in the above mentioned steps, and completely evacuated by the evacuation device 63 in the vacuum device 60 shown in FIG. 6 until $2\times10^{-6}$ Pa is reached, and an anode voltage Va=10 kV is applied to the anode electrode 61 H=2 mm apart as shown in FIG. 6.

At this time, a pulse voltage of device voltage Vf=20 V is applied to the electron-emitting device, and the flowing device current If and the electron emission current Ie are measured.

The Ie characteristic of the electron-emitting device shows a sudden increase of Ie from the half of the applied voltage, and the electron emission current Ie of about 1 μA is measured with Vf of 15 V. Thus, a preferable electron emission characteristic can be obtained with a small fluctuation of Ie with time.

On the other hand, If is similar to the characteristic of Ie, and the value is smaller than the value of Ie by one digit.

Figure 13:
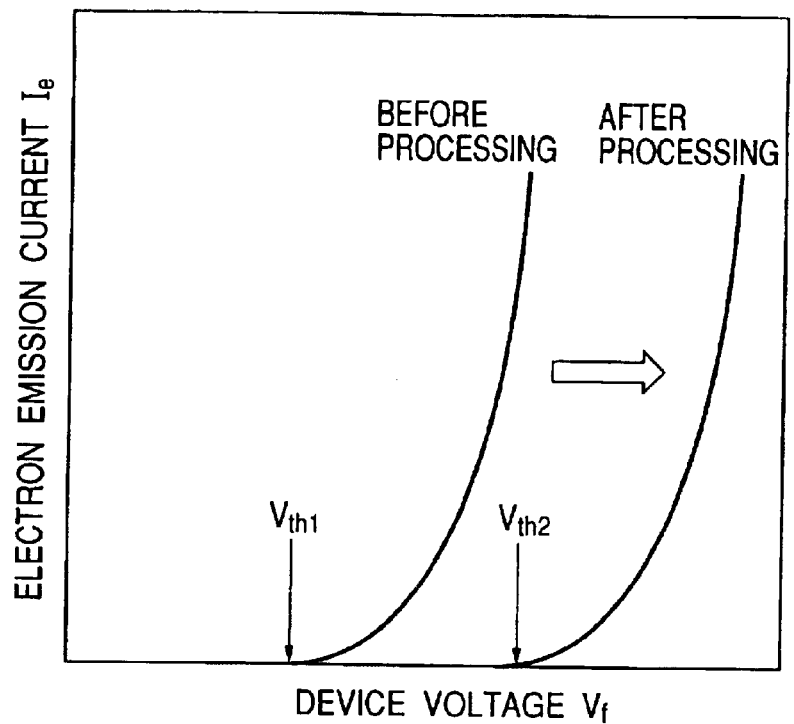
FIG. 13 shows the type of an equalizing process according to the present invention.

The mechanism of the equalizing process according to the present embodiment is described below by referring to FIG. 13. FIG. 13 shows a change in device characteristic before and after the equalizing process.

The electron-emitting device before the equalizing process shows the characteristic of emitting an electron at the threshold $V_{th1}$ (about 1 V/μm). Then, as described above, when a pulse voltage is applied to the device in the $O_2$ gas, the electron emission current of the device is suddenly reduced by the mechanism of the chemical etching of the above mentioned carbon. The voltage applied to the device is gradually increased, and the process is performed until no emission is emitted at the threshold voltage of $V_{th2}$.

When the device characteristic is evaluated after evacuating the $O_2$ gas, the characteristic has been changed such that an electron is emitted at the threshold of $V_{th2}$. At this time, it is assumed that the fluctuation width of the electron emission current obtained by the electron emission has been reduced, and the number of electron emission points has increased in the equalizing process.

The diameter of an electron beam emitted from the device obtained according to the present embodiment is long in the Y direction and short in the X direction, that is, substantially rectangular.

(Second Embodiment)

An example of the equalizing process performed by emitting an electron as biased between the cathode electrode of the electron-emitting device and the anode opposing the electron-emitting device in the $O_2$ gas in the second embodiment.

(Step 1)

In the method similarly used in the steps 1 to 4 according to the first embodiment, the extraction electrode 2 and the cathode electrode 3 are formed on the substrate 1, and fibrous carbon is produced as the electron-emitting member 4 on the substrate 1.

(Step 2)

The electron-emitting device is provided for the vacuum device 20 as shown in FIGS. 2A and 2B, the evacuation device 23 performs the evacuation process until $2\times10^{-6}$ Pa is reached, the gas leading valve 22 leads the $O_2$ gas until the vacuum level in the vacuum device 20 reaches 1×10−4 Pa, and the pulse voltage of Vf=20 V (with the pulse width of 10 msec and the pulse length of 4 msec) is applied to the cathode electrode 3 of the electron-emitting device with the extraction electrode 2 of the electron-emitting device set positive. Simultaneously, a voltage of Va=10 kV is applied to the anode 24. The system is operated in this state for 1 hour, and the electron-emitting member 4 is equalized.

The electron-emitting device produced as mentioned above is fixed to the Vr of 15 V, the inter-anode distance H is fixed to 2 mm, and the device is driven with the anode voltage Va of 10 kV. With the configuration, a stable Ie can be obtained as in the first embodiment.

(Third Embodiment)

An example of the equalizing process performed for each line of a matrix in the display device comprising a matrix electron source in which a plurality of electron-emitting devices are provided is described below by referring to FIGS. 8 and 9.

In FIG. 8, reference numeral 81 denotes an electron source substrate, reference numeral 82 is X direction wiring, and reference numeral 83 is Y direction wiring, reference numeral 84 denotes an electron-emitting device, and reference numeral 85 denotes a connection line.

When the device capacity of a plurality of devices increases, the waveform becomes unclear by the capacity elements although a short pulse accompanied by the pulse width modulation is added in the matrix wiring as shown in FIG. 8, and the problem that an expected gray scale cannot be obtained, etc. occurs.

Therefore, according to the present embodiment as in the first embodiment, an inter-layer insulation layer is provided close to the electron-emitting member 4, thereby reducing the increase by the capacity element outside the element emission area.

In FIG. 8, the X direction wiring 82 comprises m pieces of wiring, that is, Dx1, Dx2, . . . , Dxm, and comprises about 1 μm thick and 300 μm wide aluminum wiring material formed in the evaporation method. The material, thickness of film, and width of the wiring are appropriately designed.

The Y direction wiring 83 comprises n pieces of wiring, that is, Dy1, Dy2, . . . , Dyn, and is 0.5 μm thick and 100 μm wide as similarly formed as the X direction wiring 82.

There is an inter-layer insulation layer not shown in the attached drawings between the m pieces of X direction wiring 82 and n pieces of Y direction wiring 83. They are electrically separated (m and n indicate positive integers).

The inter-layer insulation layer not shown in the attached drawings is configured by a 0.8 μm thick $SiO_2$ in the spatter method, etc. The thickness of the inter-layer insulation layer is determined such that it can be formed in a desired shape on all or a part of the substrate 81 forming the X direction wiring 82, specifically such that it is durable against the potential difference of the cross portion between the X direction wiring 82 and the Y direction wiring 83, that is, the device capacity per device is 1 pF or smaller, and the device durability of 30 V according to the present embodiment.

The X direction wiring 82 and the Y direction wiring 83 are lead as external terminals.

A pair of electrodes (not shown in the attached drawings) forming the electron-emitting device 84 electrically connected through m pieces of X direction wiring 82, n pieces of Y direction wiring 83, and the connection line 85 comprising a conductive metal, etc.

According to the present embodiment, the Y direction wiring and the X direction wiring are connected respectively as the cathode electrode side and the extraction electrode side.

The n pieces of Y direction wiring of Dy1, Dy2, . . . Dyn are commonly grounded, the pulse voltage on the positive side to the ground is applied to Dx1, the electron-emitting device 84 of the row Dx1 is selected, and the equalizing process is performed.

Then, a similar voltage is applied to Dx2, the electron-emitting device 84 of the row Dx2 is selected, and the equalizing process is performed. Similarly, the rows Dx3, Dx4, . . . , Dxm are selected to perform the equalizing process sequentially in the X direction.

The image-forming apparatus configured using the electron source in the simple matrix array is described below by referring to FIG. 9. FIG. 9 shows the display panel of the image-forming apparatus using soda lime glass as a glass substrate material.

In FIG. 9, reference numeral 81 denotes an electron source substrate for which a plurality of electron-emitting devices are provided, reference numeral 91 denotes a rear plate to which the electron source substrate 81 is fixed, and reference numeral 96 denotes a face plate in which the fluorescent film 94, the metal back 95, etc. are formed inside the glass substrate 93. Reference numeral 92 denotes a support frame to which the rear plate 91 and the face plate 96 are connected using frit glass, etc. Reference numeral 97 denotes an envelope which is sealed by baking at the temperature of 450° C. in the vacuum for ten minutes.

Reference numeral 84 denotes an electron-emitting device. X direction wiring 82 and Y direction wiring 83 are connected to a pair of device electrodes of an electron-emitting device. The respective row wiring and column wiring of the X direction wiring 82 and the Y direction wiring 83 are lead outside the envelope 97 as terminals of Dox1 to Doxm and Doy1 to Doyn.

The envelope 97 comprises the face plate 96, the support frame 92, and the rear plate 91 as described above. In the other hand, the envelope 97 having sufficient strength against the atmosphere by providing a support referred to as a spacer, but not shown in the attached drawings between the face plate 96 and the rear plate 91.

The metal back 95 performs a smoothing process (normally referred to as a "filming") on the inner surface of the fluorescent film 94 after producing the fluorescent film 94, and then the vacuum evaporation process, etc. is performed, thereby piling Al.

To enhance the conductivity of the fluorescent film 94, the face plate 96 is provided with a transparent electrode (not shown in the attached drawings) outside the fluorescent film 94.

Since the electron from the electron source is emitted to the extraction electrode 2 side according to the present embodiment, the fluorescent film 94 is provided in the position 200 μm shifted toward the extraction electrode 2 when the anode voltage Va is 10 kV and the inter-anode distance H is 2 mm.

Thus, the obtained matrix electron source indicates equal characteristic for each electron-emitting device 84, and indicates little distribution of Ie, therefore it is desired as a display device, etc.

(Fourth Embodiment)

According to the present embodiment, an example of an equalizing process is performed for each electron-emitting device in the display device as an image-forming apparatus comprising a matrix electron source for which a plurality of electron-emitting devices are provided.

As in the third embodiment, the matrix electron source as shown in FIG. 8 is produced. According to the present embodiment, the Y direction wiring 83 is connected to the cathode electrode, and the X direction wiring 82 is connected to the extraction electrode.

A voltage is applied to Dy1 and Dx1, the electron-emitting device 84 at the cross portion between Dy1 and Dx1 is selected, and it is independently driven and the equalizing process is performed.

Then, a similar voltage is applied to Dy1 and Dx2, the electron-emitting device 84 at the cross portion between Dy1 and Dx2 is independently selected, and the equalizing process is performed. Similarly, the equalizing process is performed sequentially on each of the electron-emitting devices 84.

Using the matrix electron source produced according to the present embodiment, the display device as shown in FIG. 9 is produced as in the third embodiment.

With the matrix electron source obtained as described above, the distribution of Ie is further reduced, and is recommended as a display device, etc.

As described above, according to the present invention, the shapes of a plurality of projections of the electron-emitting member 4 are equalized. Therefore, a local field condensation is avoided on the electron-emitting member, and the electron emission characteristic can be equalized. Additionally, the local field condensation which causes high current density and an overload can be suppressed, thereby avoiding the reduction of an emission current.

Therefore, the induction of discharge can be suppressed, the durability of the electron-emitting device can be elongated, and a stable electron emission current with a small fluctuation with time can be maintained for a long period.

Furthermore, for an electron source and an image-forming apparatus provided with a plurality of electron-emitting devices, the electron emission current of each electron-emitting device can be stably maintained. Therefore, the durability of each pixel can be elongated, the brightness of an image can be successfully represented, and the flicker of an image can be avoided, thereby maintaining a constant display characteristic for a long period.

What is claimed is:

1. A method for producing an electron-emitting device, comprising the steps of:
   (A) disposing a cathode electrode on a surface of a substrate;
   (B) providing an electrode opposite the cathode electrode;
   (C) disposing plural pieces of fiber containing carbon on the cathode electrode; and
   (D) applying a potential higher than a potential applied to the cathode electrode under depressurized condition to an electrode opposite the cathode electrode.

2. The method for producing an electron-emitting device, according to claim 1, wherein
   said electrode opposite the cathode electrode is an anode electrode provided apart the substrate.

3. The method for producing an electron-emitting device, according to claim 1, wherein
   said electrode opposite the cathode electrode is an extracting electrode provided apart from the cathode electrode on the surface of the substrate.

4. The method for producing an electron-emitting device, according to claim 1, wherein
   said step of applying potential to the electrode opposite the cathode electrode is a step of increasing the number of emission sites.

5. The method for producing an electron-emitting device, according to claim 1, wherein said potential applied to the electrode opposite the cathode electrode is potential at which an electron is emitted from at least one fiber of a plurality of fibers containing carbon as a main component.

6. A method for producing an electron-emitting device according to claim 5, wherein said step of applying the potential to the electrode opposite the cathode electrode includes a process of removing a part of the at least one fiber using heat due to electron emitting from the at least one fiber among the plurality of fibers containing carbon as a main component.

7. The method for producing an electron-emitting device, according to claim 1, wherein
   said step of applying the potential to the electrode opposite the cathode electrode is performed under condition of a gas chemically or physically reactive to the plural pieces of fiber.

8. The method for producing an electron-emitting device, according to claim 7, wherein
   said gas chemically reactive to the plural pieces of fiber is one of $O_2$, $H_2$, $CO_2$, and $H_2O$.

9. The method for producing an electron-emitting device, according to claim 7, wherein
   a pressure for introducing the gas is equal to or over $1 \times 10^{-4}$ Pa.

10. The method for producing an electron-emitting device, according to claim 7, wherein
    said step of applying the potential to the electrode opposite the cathode electrode is a step of applying a pulse voltage between the cathode electrode and the electrode opposite the cathode electrode.

11. The method for producing an electron-emitting device, according to claim 1, wherein
    said plural pieces of fiber are formed by decomposing a hydrogen carbide gas.

12. The method for producing an electron-emitting device, according to claim 11, wherein
    said plural pieces of fiber are formed by decomposing the hydrogen carbide gas using a catalyst provided on the cathode electrode in advance.

13. The method for producing an electron-emitting device, according to claim 12, wherein
    said catalyst is one of Fe, Co, Pd, and Ni, or an alloy consisting of materials selected from among Fe, Co, Pd, and Ni.

14. The method for producing an electron-emitting device, according to claim 1, wherein
    said plural pieces of fiber are formed by graphite nanofiber, carbon nanotube, or amorphous carbon fiber.

15. The method for producing an electron-emitting device, according to claim 1, wherein
    said plural pieces of fiber comprise a graphen.

16. The method for producing an electron-emitting device, according to claim 1, wherein
    said plural pieces of fiber comprise a plurality of graphens.

17. The method for producing an electron-emitting device, according to claim 16, wherein
    said plurality of graphens are layered in an axial direction of the plural pieces of fiber.

18. A method for producing an electron source obtained by arranging a plurality of electron-emitting devices, which are each produced according to the method of any one of claims 1 to 17.

19. A method for producing an image-forming apparatus having an electron source and an image-forming member, wherein
    said electron source is produced according to the method of claim 18.

20. A method for producing an electron source having a plurality of electron-emitting devices, comprising the steps of:
    (A) providing on a substrate a plurality of electron-emitting devices comprising plural pieces of fiber containing carbon and plural pieces of wiring electrically connected to at least one of the plurality of electron-emitting devices;
    (B) measuring by applying a voltage to at least a part of the plurality of electron-emitting devices, an electrical characteristic of said at least a part of the plurality of electron-emitting devices to which the voltage is applied;
    (C) reducing a difference in electrical characteristic among the plurality of electron-emitting devices based on a measurement result, wherein
       said step of reducing the difference in characteristic among the plurality of electron-emitting devices comprising a step of emitting an electron from at least one of the plurality of electron-emitting devices under depressurized condition.

21. The method for producing an electron source, according to claim 20, wherein
    said plural pieces of wiring comprise plural pieces of row direction wirings, and plural pieces of column direction wirings crossing the row direction wirings, and each of the electron-emitting devices is connected to one of the row direction wirings and one of the column direction wirings.

22. The method for producing an electron source, according to claim 21, wherein
    said step of reducing the difference in characteristic among the plurality of electron-emitting devices contains a step of emitting an electron from a desired electron-emitting device by repeating a step of selecting from said plural pieces of column direction wirings or said plural piece of row direction wirings, a part of the pieces of column direction wirings or row direction wirings, and emitting an electron from an electron-emitting device connected to the selected wiring.

23. The method for producing an electron source, according to claim 20, wherein said step of reducing the difference in characteristic among the plurality of electron-emitting devices contains a step of emitting an electron from a desired electron-emitting device by repeating a step of selecting a part of electron-emitting devices from among the plurality of electron-emitting devices and emitting an electron from the selected electron-emitting device.

24. The method for producing an electron source, according to claim 20, wherein:

said electron-emitting device contains a cathode electrode to which the fiber is electrically connected, and a leading electrode provided apart from the cathode electrode; and said step of emitting an electron from the electron-emitting device is performed by applying a voltage between the cathode electrode and the extracting electrode.

25. The method for producing an electron source, according to claim 20, wherein said step of emitting an electron from the electron-emitting device is performed by applying a voltage between the electrode provided apart from the substrate and the electron-emitting device.

26. The method for producing an electron source, according to claim 20, wherein:

said electron-emitting device contains a cathode electrode to which the fiber is electrically connected, and an extracting electrode provided apart from the cathode electrode; and said step of emitting an electron from the electron-emitting device is performed by applying a potential difference between an electrode provided apart from the substrate and the electron-emitting device.

27. The method for producing an electron source, according to claim 20, wherein said step of reducing the difference in characteristic among the plurality of electron-emitting devices is a step of increasing the number of emission sites of at least one, electron-emitting device.

28. The method for producing an electron source, according to claim 20, wherein said step of reducing the difference in characteristic among the plurality of electron-emitting devices is performed in ambient of a gas chemically or physically reactive to the fiber.

29. The method for producing an electron source, according to claim 28, wherein said gas chemically reactive to the fiber contains a gas selected at least from among $O_2$, $H_2$, $CO_2$, and $H_2O$.

30. The method for producing an electron source, according to claim 29, wherein a pressure for introducing the gas is equal to or over $1 \times 10^{-4}$ Pa.

31. The method for producing an electron source, according to claim 28, wherein said step of emitting an electron from the electron-emitting device is performed by applying a pulse voltage to the electron-emitting device.

32. The method for producing an electron source, according to claim 20, wherein said fiber is formed by decomposing a hydrogen carbide gas.

33. The method for producing an electron-emitting device, according to claim 32, wherein said fiber is formed by decomposing the hydrogen carbide gas using a catalyst provided on the cathode electrode in advance.

34. The method for producing an electron-emitting device, according to claim 33, wherein said catalyst is one of Fe, Co, Pd, and Ni, or an alloy consisting of materials selected from among Fe, Co, Pd, and Ni.

35. The method for producing an electron-emitting device, according to claim 20, wherein said fiber is formed by graphite nanofiber, carbon nanotube, or amorphous carbon fiber.

36. The method for producing an electron-emitting device, according to claim 20, wherein said fiber comprises a graphen.

37. The method for producing an electron-emitting device, according to claim 20, wherein said fiber comprises a plurality of graphens.

38. An electron-emitting device according to claim 37, wherein said plurality of graphens are layered in an axial direction of the fiber containing carbon.

39. A method for producing an image-forming apparatus having an electron source and an electron-emitting member, wherein said electron source is produced according to the method of any one of claims 20 to 38.

40. The method for producing an image-forming apparatus, according to claim 39, wherein said image-forming apparatus is obtained by seal bonding a first substrate provided with the image-forming member with a second substrate provided with the electron source, and an electrical characteristic of the electron-emitting device is measured before the first and second substrates are seal bonded with each other.

41. The method for producing an image-forming apparatus, according to claim 39, wherein said image-forming apparatus is obtained by seal bonding a first substrate provided with the image-forming member with a second substrate provided with the electron source, and said step of reducing the difference in electrical characteristic among the plurality of electron-emitting devices is performed before the first and second substrates are seal bonded with each other.

42. A method for producing an electron-emitting device, comprising the steps of:

(A) disposing a first electrode, having a plurality of carbon fibers, on a surface of a substrate;

(B) arranging a second electrode opposite the first electrode;

(C) removing a part of at least one of the plurality of carbon fibers by applying a voltage between the first and second electrodes under depressurized condition.

43. A method for producing an electron source having a plurality of electron-emitting devices, wherein said electron-emitting devices are each produced according to the method of claim 42.

44. A method for producing an image-forming apparatus having an electron source and an image-forming member, wherein said electron source is produced according to the method of claim 43.

* * * * *

UNITED STATES PATENT AND TRADEMARK OFFICE
CERTIFICATE OF CORRECTION

PATENT NO. : 6,848,962 B2
DATED : February 1, 2005
INVENTOR(S) : Shin Kitamura et al.

It is certified that error appears in the above-identified patent and that said Letters Patent is hereby corrected as shown below:

Title page, Item [54] and Column 1, line 5,
Title, "ELECTRON-EMITTING APPARATUS" should read -- IMAGE FORMING APPARATUS --.

Title page,
Item [56], References Cited, FOREIGN PATENT DOCUMENTS,
"JP   5-211029   8/1993 ............ H01J/1/30" should be deleted (duplication); and "JP 8-115652   5/1996" should be deleted (duplication).
OTHER PUBLICATIONS, after "H. Dai et al.", "Disproportionati n" should read
-- Disproportionation --; and after "M.I. Elinson et al.", "El ctrons" should read
-- Electrons --.

Column 2,
Line 45, "le" should read -- Ie --.

Column 8,
Line 16, "a" should read -- an --;
Line 17, "a" should read -- an --; and
Line 37, "millions)" should read -- million×) --.

Column 9,
Line 19, "stable" should read -- stably --; and
Line 66, "a" should read -- an --.

Column 10,
Line 33, "of" should read -- on --.

Column 12,
Line 11, "becomes" should read -- become --.

Column 13,
Line 50, "pieces" should read -- piece --;
Line 56, "using the above men-" should be deleted; and
Line 57, "tioned matrix wiring" should be deleted.

Column 16,
Line 33, "1×10-4 Pa," should read -- $1 \times 10^{-4}$ Pa, --.

Column 17,
Line 67, "In" should read -- On --.

UNITED STATES PATENT AND TRADEMARK OFFICE
CERTIFICATE OF CORRECTION

PATENT NO.   : 6,848,962 B2
DATED        : February 1, 2005
INVENTOR(S)  : Shin Kitamura et al.

It is certified that error appears in the above-identified patent and that said Letters Patent is hereby corrected as shown below:

<u>Column 19, line 6 through Column 22, line 57,</u>
Claims 1-42 should be deleted and substituted with the following claims 1-42:

--1.  A method for producing an electron-emitting device, comprising the steps of:

(A) disposing a cathode electrode having a plurality of fibers on a surface of a substrate;

(B) providing an electrode opposite the cathode electrode; and (C) applying a potential higher than a potential applied to the cathode electrode under a depressurized condition to an electrode opposite the cathode electrode, wherein each fiber comprises a plurality of graphenes stacked in a direction that is not perpendicular to an axis direction of each fiber.

2. The method for producing an electron-emitting device, according to claim 1, wherein said electrode opposite the cathode electrode is an anode electrode provided apart the substrate.

3. The method for producing an electron-emitting device, according to claim 1, wherein said electrode opposite the cathode electrode is an extraction electrode for extracting electrons from at least one of the plurality of fibers, provided apart from the cathode electrode on the surface of the substrate.

4. The method for producing an electron-emitting device, according to claim 1, wherein said step of applying the potential to the electrode opposite the cathode electrode is a step of increasing a number of emission sites.

5. The method for producing an electron-emitting device, according to claim 1, wherein said potential applied to the electrode opposite the cathode electrode is a potential at which an electron is emitted from at least one of the plurality of fibers.

6. A method for producing an electron-emitting device according to Claim 5, wherein said step of applying the potential to the electrode opposite the cathode electrode includes a process of removing a part of the at least one fiber using heat due to electron emitting from the at least one fiber among the plurality of fibers.

UNITED STATES PATENT AND TRADEMARK OFFICE
CERTIFICATE OF CORRECTION

PATENT NO. : 6,848,962 B2
DATED : February 1, 2005
INVENTOR(S) : Shin Kitamura et al.

It is certified that error appears in the above-identified patent and that said Letters Patent is hereby corrected as shown below:

Column 19, line 6 through Column 22, line 57 (cont'd),

7.    The method for producing an electron-emitting device, according to claim 1, wherein said step of applying the potential to the electrode opposite the cathode electrode is performed under a condition of a gas chemically or physically reactive to the plurality of fibers.

8.    The method for producing an electron-emitting device, according to claim 7, wherein said gas chemically reactive to the plurality of fibers is one of $O_2$, $H_2$, $CO_2$, and $H_2O$.

9.    The method for producing an electron-emitting device, according to claim 7, wherein a pressure for introducing the gas is equal to or over $1 \times 10^{-4}$ Pa.

10.    The method for producing an electron-emitting device, according to claim 7, wherein said step of applying the potential to the electrode opposite the cathode electrode is a step of applying a pulse voltage between the cathode electrode and the electrode opposite the cathode electrode.

11.    The method for producing an electron-emitting device, according to claim 1, wherein the plurality of fibers are formed by decomposing a hydrocarbon gas.

12.    The method for producing an electron-emitting device, according to claim 11, wherein the plurality of fibers are formed by decomposing the hydrocarbon gas using a catalyst provided on the cathode electrode in advance.

13.    The method for producing an electron-emitting device, according to claim 12, wherein said catalyst is one of Fe, Co, Pd, and Ni, or an alloy consisting of materials selected from among Fe, Co, Pd, and Ni.

14.    A method for producing an electron source obtained by arranging a plurality of electron-emitting devices, which are each produced according to the method of any one of claims 1 to 13.

UNITED STATES PATENT AND TRADEMARK OFFICE
CERTIFICATE OF CORRECTION

PATENT NO. : 6,848,962 B2
DATED : February 1, 2005
INVENTOR(S) : Shin Kitamura et al.

It is certified that error appears in the above-identified patent and that said Letters Patent is hereby corrected as shown below:

Column 19, line 6 through Column 22, line 57 (cont'd),

15. A method for producing an image-forming apparatus having an electron source and an image-forming member, wherein said electron source is produced according to the method of claim 14.

16. A method for producing an electron source having a plurality of electron-emitting devices, comprising the steps of:

(A) providing on a substrate a plurality of electron-emitting devices comprising plural pieces of fiber containing carbon, and plural pieces of wiring electrically connected to at least one of the plurality of electron-emitting devices;

(B) measuring by applying a voltage to at least a part of the plurality of electron-emitting devices, an electrical characteristic of said at least a part of the plurality of electron-emitting devices to which the voltage is applied;

(C) reducing a difference in electrical characteristic among the plurality of electron-emitting devices based on a measurement result, wherein said step of reducing the difference in characteristic among the plurality of electron-emitting devices comprising a step of emitting an electron from at least one of the plurality of electron-emitting devices under depressurized condition.

17. The method for producing an electron source, according to claim 16, wherein said plural pieces of wiring comprise plural pieces of row direction wirings, and plural pieces of column direction wirings crossing the row direction wirings, and each of the electron-emitting devices is connected to one of the row direction wirings and one of the column direction wirings.

18. The method for producing an electron source, according to claim 17, wherein said step of reducing the difference in characteristic among the plurality of electron-emitting devices contains a step of emitting an electron from a desired electron-emitting device by repeating a step of selecting from said plural pieces of column direction wirings or said plural pieces of row direction wirings, a part of the pieces of column direction wirings or row direction wirings, and emitting an electron from an electron-emitting device connected to the selected wiring.

19. The method for producing an electron source, according to claim 16, wherein said step of reducing the difference in characteristic among the plurality of electron-emitting devices contains a step of emitting an electron from a desired electron-emitting device by repeating a step of selecting a part of electron-emitting devices from among the plurality of electron-emitting devices and emitting an electron from the selected electron-emitting device.

UNITED STATES PATENT AND TRADEMARK OFFICE
CERTIFICATE OF CORRECTION

PATENT NO. : 6,848,962 B2
DATED : February 1, 2005
INVENTOR(S) : Shin Kitamura et al.

It is certified that error appears in the above-identified patent and that said Letters Patent is hereby corrected as shown below:

Column 19, line 6 through Column 22, line 57 (cont'd),

20. The method for producing an electron source, according to claim 16, wherein:

said electron-emitting device contains a cathode electrode to which the fiber is electrically connected, and an extracting electrode provided apart from the cathode electrode; and said step of emitting an electron from the at least one electron-emitting device is performed by applying a voltage between the cathode electrode and the extracting electrode 21. The method for producing an electron source, according to claim 16, wherein said step of emitting an electron from the at least one electron-emitting device is performed by applying a voltage between an electrode provided apart from the substrate and the electron-emitting device.

22. The method for producing an electron source, according to claim 16, wherein said electron-emitting device contains a cathode electrode to which the fiber is electrically connected, and an extracting electrode provided apart from the cathode electrode; and said step of emitting an electron from the at least one electron-emitting device is performed by applying a potential difference between an electrode provided apart from the substrate and the electron-emitting device.

23. The method for producing an electron source, according to claim 16, wherein said step of reducing the difference in characteristic among the plurality of electron-emitting devices is a step of increasing a number of emission sites of at least one electron-emitting device.

24. The method for producing an electron source, according to claim 16, wherein said step of reducing the difference in characteristic among the plurality of electron-emitting devices is performed in ambient of a gas chemically or physically reactive to the fiber.

25. The method for producing an electron source, according to claim 24, wherein said gas chemically reactive to the fiber contains a gas selected at least from among $O_2$, $H_2$, $CO_2$, and $H_2O$.

26. The method for producing an electron source, according to claim 25, wherein a pressure for introducing the gas is equal to or over $1 \times 10^{-4}$ Pa.

UNITED STATES PATENT AND TRADEMARK OFFICE
CERTIFICATE OF CORRECTION

PATENT NO. : 6,848,962 B2
DATED : February 1, 2005
INVENTOR(S) : Shin Kitamura et al.

It is certified that error appears in the above-identified patent and that said Letters Patent is hereby corrected as shown below:

Column 19, line 6 through Column 22, line 57 (cont'd),

27. The method for producing an electron source, according to claim 24, wherein said step of emitting an electron from at least one of the plurality of electron-emitting devices is performed by applying a pulse voltage to the at least one electron-emitting device.

28. The method for producing an electron source, according to claim 16, wherein said plural pieces of fiber are formed by decomposing a hydrocarbon gas.

29. The method for producing an electron source, according to claim 16, wherein said plural pieces of fiber are formed by decomposing hydrocarbon gas using a catalyst provided on the cathode electrode in advance.

30. The method for producing an electron source, according to claim 29, wherein said catalyst is one of Fe, Co, Pd, and Ni, or an alloy consisting of materials selected from among Fe, Co, Pd, and Ni.

31. The method for producing an electron source, according to claim 16, wherein said fiber is formed by graphite nanofiber, carbon nanotube, or amorphous carbon fiber.

32. The method for producing an electron source, according to claim 16, wherein said fiber comprises a graphene.

33. The method for producing an electron source, according to claim 16, wherein said fiber comprises a plurality of graphenes.

34. The method for producing an electron source, according to claim 33, wherein said plurality of graphenes are stacked in a direction that is not perpendicular to an axis direction of each fiber.

35. A method for producing an image-forming apparatus having an electron source and an image-forming member, wherein said electron source is produced according to the method of any one of claims 16 to 34.

UNITED STATES PATENT AND TRADEMARK OFFICE
CERTIFICATE OF CORRECTION

PATENT NO. : 6,848,962 B2
DATED : February 1, 2005
INVENTOR(S) : Shin Kitamura et al.

It is certified that error appears in the above-identified patent and that said Letters Patent is hereby corrected as shown below:

Column 19, line 6 through Column 22, line 57 (cont'd),

36. The method for producing an image-forming apparatus, according to claim 35, wherein said image-forming apparatus is obtained by seal bonding a first substrate provided with the image-forming member with a second substrate provided with the electron source, and an electrical characteristic of at least one of the electron-emitting devices is measured before the first and second substrates are seal bonded with each other.

37. The method for producing an image-forming apparatus, according to claim 35, wherein said image-forming apparatus is obtained by seal bonding a first substrate provided with the image-forming member with a second substrate provided with the electron source, and said step of reducing the difference in electrical characteristic among the plurality of electron-emitting devices is performed before the first and second substrates are seal bonded with each other.

38. A method for producing an electron-emitting device, comprising the steps of:

(A) disposing a cathode electrode having a plurality of fibers, on a surface of a substrate;

(B) providing an electrode opposite the cathode electrode; and (C) applying a potential higher than a potential applied to the cathode electrode under a depressurized condition to the electrode opposite the cathode electrode, wherein said step of applying the potential to the electrode opposite the cathode electrode is a step of increasing a number of emission sites.

39. A method for producing an electron source having a plurality of electron-emitting devices, comprising the steps of:

providing on a substrate a plurality of electron-emitting devices comprising plurality pieces of fiber; and reducing a difference in electron emission characteristics among the plurality of electron-emitting devices, wherein said step of reducing comprises a step of emitting electrons from at least one of the plurality of electron-emitting devices under a depressurized condition, and wherein each fiber comprises a plurality of graphenes stacked in a direction that is not perpendicular to an axis direction of each fiber.

40. A method for producing an electron source having a plurality of electron-emitting devices, comprising the steps of:

UNITED STATES PATENT AND TRADEMARK OFFICE
CERTIFICATE OF CORRECTION

PATENT NO.    : 6,848,962 B2
DATED         : February 1, 2005
INVENTOR(S)   : Shin Kitamura et al.

It is certified that error appears in the above-identified patent and that said Letters Patent is hereby corrected as shown below:

Column 19, line 6 through Column 22, line 57 (cont'd), provreiding on a substrate a plurality of electron-emitting devices comprising plural pieces of fiber;

identifying at least one lowest electron-emitting device having a lowest electron emission threshold voltage among the plurality of electron-emitting devices; and shifting each electron emission threshold voltage of electron-emitting devices other than the at least one lowest electron-emitting device, so as to become closer to the lowest electron emission threshold voltage, by performing an electron emission from the electron-emitting devices other than the at least one lowest electron-emitting device, under a depressurized condition.

41.   The method of producing an electron source, according to claim 40, wherein each fiber comprises a plurality of graphenes stacked in a direction that is not perpendicular to an axis direction of each fiber.

42.   A method for producing an electron-emitting device, comprising the steps of:

(A)   disposing a cathode electrode having a plurality of fibers on a surface of a substrate;

(B)   providing an electrode opposite the cathode electrode; and (C)   applying a potential higher than a potential applied to the cathode electrode under a depressurized condition to an electrode opposite the cathode electrode, wherein each fiber comprises a plurality of graphenes which are stacked so as not to be parallel to an axis direction of each fiber.--

Signed and Sealed this

Thirtieth Day of August, 2005

JON W. DUDAS
*Director of the United States Patent and Trademark Office*

UNITED STATES PATENT AND TRADEMARK OFFICE
CERTIFICATE OF CORRECTION

PATENT NO.        : 6,848,962 B2
APPLICATION NO. : 09/940643
DATED             : February 1, 2005
INVENTOR(S)       : Kitamura et al.

It is certified that error appears in the above-identified patent and that said Letters Patent is hereby corrected as shown below:

On the Title page,

[*] Notice:   Subject to any disclaimer, the term of this patent is extended or adjusetd under 35 USC 154(b) by (283) days Delete the phrase "by 283" and insert -- by 272 days--

Signed and Sealed this

Twentieth Day of February, 2007

JON W. DUDAS
*Director of the United States Patent and Trademark Office*